(12) United States Patent
Wu

(10) Patent No.: US 12,160,888 B2
(45) Date of Patent: Dec. 3, 2024

(54) WIRELESS COMMUNICATION METHOD AND APPARATUS, AND COMMUNICATION DEVICE

(71) Applicant: GUANGDONG OPPO MOBILE TELECOMMUNICATIONS CORP., LTD., Guangdong (CN)

(72) Inventor: Zuomin Wu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 344 days.

(21) Appl. No.: 17/656,388

(22) Filed: Mar. 24, 2022

(65) Prior Publication Data

US 2022/0217773 A1 Jul. 7, 2022

Related U.S. Application Data

(63) Continuation of application No. PCT/CN2019/130654, filed on Dec. 31, 2019.

(51) Int. Cl.
*H04W 74/0808* (2024.01)
*H04W 74/00* (2009.01)

(52) U.S. Cl.
CPC ..... *H04W 74/0808* (2013.01); *H04W 74/006* (2013.01)

(58) Field of Classification Search
CPC ........... H04W 74/0808; H04W 74/006; H04W 74/004; H04W 74/0833
(Continued)

(56) References Cited

U.S. PATENT DOCUMENTS

2017/0223675 A1 8/2017 Dinan et al.
2017/0289869 A1 10/2017 Nogami et al.
(Continued)

FOREIGN PATENT DOCUMENTS

CN 108886447 A 11/2018
CN 109155720 A 1/2019
(Continued)

OTHER PUBLICATIONS

Ericsson "Discussions on transmission opportunities of Msg3 in NR-U" Tdoc R2-1907594; 3GPP TSG-RAN WG2 #106; Reno, USA; May 13-17, 2019. 5 pages.
(Continued)

*Primary Examiner* — Chuong T Ho
(74) *Attorney, Agent, or Firm* — PERKINS COIE LLP

(57) ABSTRACT

The present application provides a wireless communication method and apparatus, and a communication device. Said method comprises: a terminal device receiving first indication information sent by a network device, the first indication information indicating first channel access parameters, the first channel access parameters being used to transmit a first uplink channel, the first indication information being information carried in a first DCI, the first DCI being used to determine the transmission of the first uplink channel and a second uplink channel; the terminal device determining that at least part of the first channel access parameters is used to transmit the second uplink channel; or the terminal device determining that second channel access parameters are used to transmit the second uplink channel; or the terminal device determining not to transmit the second uplink channel. In the implementations of the present application, the terminal device may determine that at least some channel access parameters in the first uplink channel or the second channel access parameters transmit the second uplink channel, or
(Continued)

determine not to transmit the second uplink channel, thereby ensuring fair sharing of resources on a shared channel.

16 Claims, 5 Drawing Sheets

(58) Field of Classification Search
USPC .................................................. 370/329, 330
See application file for complete search history.

(56) References Cited

U.S. PATENT DOCUMENTS

| | | | | |
|---|---|---|---|---|
| 2018/0227936 | A1* | 8/2018 | Yerramalli | ............ H04L 5/0055 |
| 2019/0075581 | A1 | 3/2019 | Salem | |
| 2019/0335496 | A1* | 10/2019 | Li | .......................... H04L 1/1887 |
| 2020/0106565 | A1* | 4/2020 | Li | ..................... H04W 74/0808 |
| 2020/0145169 | A1* | 5/2020 | Zhou | ..................... H04W 76/27 |
| 2021/0298045 | A1* | 9/2021 | Kim | ................... H04W 72/0453 |
| 2021/0298080 | A1* | 9/2021 | Wu | ................... H04W 74/0816 |
| 2022/0408461 | A1* | 12/2022 | Lei | ......................... H04W 72/23 |

FOREIGN PATENT DOCUMENTS

| | | |
|---|---|---|
| CN | 109413744 A | 3/2019 |
| CN | 109716853 A | 5/2019 |
| CN | 110249701 A | 9/2019 |
| CN | 110383930 A | 10/2019 |
| EP | 3429296 A1 | 1/2019 |

OTHER PUBLICATIONS

Extended European Search Report for European Application No. 19958570.4 issued Sep. 9, 2022. 10 pages.
Nokia et al. "Channel access and co-existence for NR-U operation" R1-1912257; 3GPP TSG RAN WG1 Meeting #99; Reno, USA; Nov. 18-22, 2019. 17 pages.
Nokia et al. "Feature Lead's Summary on Channel Access Procedures" R1-1912258; 3GPP TSG RAN WG1 Meeting #99; Reno, US; Nov. 18-22, 2019. 25 pages.
Examination Report of the European application No. 19958570.4, issued on Jun. 21, 2023. 7 pages.
First Office Action of the Chinese application No. 202210643092.X, issued on Jun. 30, 2023. 14 pages with English translation.
Second Office Action of the European application No. 19958570.4, issued on Nov. 27, 2023. 5 pages.
3GPP TSG RAN WG1 Meeting #99—R1-1913517—Reno, US, Nov. 18-22, 2019—Nokia, Nokia Shanghai Bell, Feature Lead's Summary #2 on Channel Access Procedures (28 pages).
International Search Report issued Aug. 31, 2020 of PCT/CN2019/130654 (4 pages).
Examination Report for European Application No. 19958570.4 Issued May 22, 2024, 4 Pages.

* cited by examiner

600

A terminal device determines first channel access parameters, the first channel access parameters are used for transmitting a first uplink channel, and the first channel access parameters include at least one of Type1 channel access, a first ECP length, or a first CAPC — 610

The terminal device determines third channel access parameters according to the first channel access parameters and/or second channel access parameters, wherein the second channel access parameters include at least one of Type1 channel access, a second ECP length, or a second CAPC, the third channel access parameters are used for transmitting a second uplink channel, and the first uplink channel is located before the second uplink channel in a time domain — 620

FIG. 6

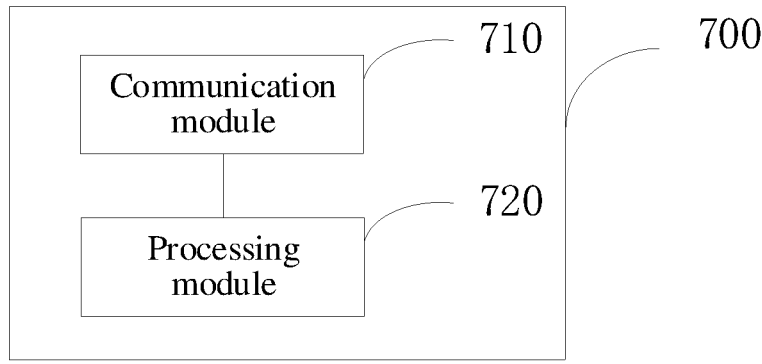

FIG. 7

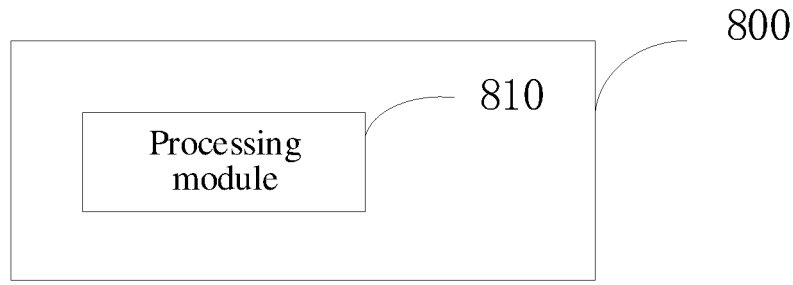

FIG. 8

WIRELESS COMMUNICATION METHOD AND APPARATUS, AND COMMUNICATION DEVICE

CROSS-REFERENCE TO RELATED APPLICATIONS

The present application is a continuation application of International PCT Application No. PCT/CN2019/130654, having an international filing date of Dec. 31, 2019, the contents of the above-identified application is hereby incorporated by reference.

TECHNICAL FIELD

Implementations of the present application relate to the field of communication, and more specifically, to a wireless communication method and apparatus, and communication device.

BACKGROUND

In a New Radio-based access to unlicensed spectrum (NR-U) system in unlicensed frequency bands, when a terminal device is scheduled to perform transmission of a Physical Uplink Shared Channel (PUSCH) or a Physical Uplink Control Channel (PUCCH), a network device may indicate a channel access solution corresponding to the PUSCH or PUCCH by carrying Downlink Control Information (DCI) of an Uplink (UL) grant or a Downlink (DL) grant.

If the terminal device needs to transmit at least two uplink channels on a shared channel in a case of scheduling through one piece of DCI, how to determine channel access parameters of the at least two channels needs to be solved.

SUMMARY

The present application provides a wireless communication method and apparatus, and a communication device, channel access parameters of at least two channels on a shared channel in a case of scheduling through one piece of DCI may be determined, thereby ensuring fair sharing of resources on the shared channel.

In a first aspect, a wireless communication method is provided, including: receiving, by a terminal device, first indication information sent by a network device, herein the first indication information indicates first channel access parameters, the first channel access parameters are used for transmitting a first uplink channel, the first indication information is information carried in first Downlink Control Information (DCI), and the first DCI is used for determining transmission of the first uplink channel and a second uplink channel; and determining, by the terminal device, that at least part of the first channel access parameters are used for transmitting the second uplink channel; or determining, by the terminal device, that second channel access parameters are used for transmitting the second uplink channel; or determining, by the terminal device, not to transmit the second uplink channel.

In the wireless communication method provided by an implementation of the present application, if at least two channels on a shared channel are scheduled through one piece of DCI, a terminal device may determine to transmit a second uplink channel by using at least part of channel access parameters in a first uplink channel or the second channel access parameters, or determine not to transmit the second uplink channel, thereby ensuring fair sharing of resources on the shared channel.

In a second aspect, a wireless communication method is provided, including: determining, by a terminal device, first channel access parameters, herein the first channel access parameters are used for transmitting a first uplink channel, and the first channel access parameters include at least one of Type1 channel access, a first Extended Cyclic Prefix (ECP) length, or a first Channel Access Priority Class (CAPC); and determining, by the terminal device, third channel access parameters according to the first channel access parameters and/or second channel access parameters, herein the second channel access parameters include at least one of Type1 channel access, a second ECP length, or a second CAPC, the third channel access parameters are used for transmitting a second uplink channel, and the first uplink channel is located before the second uplink channel in a time domain.

In the wireless communication method provided by an implementation of the present application, for a two-act random access procedure of a terminal device, the terminal device may determine third channel access parameters used for transmitting a second uplink channel based on first channel access parameters and/or the second channel access parameters, thereby ensuring fair sharing of resources on a shared channel.

In a third aspect, a wireless communication apparatus is provided, including: a communication module configured to receive first indication information sent by a network device, herein the first indication information indicates first channel access parameters, the first channel access parameters are used for transmitting a first uplink channel, the first indication information is information carried in first DCI, and the first DCI is used for determining transmission of the first uplink channel and a second uplink channel; and a processing module configured to determine that at least part of the first channel access parameters are used for transmitting the second uplink channel; or configured to determine that second channel access parameters are used for transmitting the second uplink channel; or configured to determine not to transmit the second uplink channel.

In a fourth aspect, a wireless communication apparatus is provided, including: a processing module configured to determine first channel access parameters, wherein the first channel access parameters are used for transmitting a first uplink channel, and the first channel access parameters include at least one of Type1 channel access, a first Extended Cyclic Prefix (ECP) length, or a first Channel Access Priority Class (CAPC); and determine third channel access parameters according to the first channel access parameters and/or second channel access parameters, wherein the second channel access parameters include at least one of Type1 channel access, a second ECP length, or a second CAPC, the third channel access parameters are used for transmitting a second uplink channel, and the first uplink channel is located before the second uplink channel in a time domain.

In a fifth aspect, a communication device is provided, including a processor and a memory. The memory is configured to store a computer program, and the processor is configured to call and run the computer program stored in the memory to perform the method in the first or second aspect described above or each implementations thereof.

In a sixth aspect, a chip is provided, configured to implement the method in the first aspect described above or each implementations thereof.

Specifically, the chip includes: a processor configured to call and run a computer program from a memory, enabling a device having the chip installed thereon to perform the method in the first or second aspect described above or each implementations thereof.

In a seventh aspect, a computer-readable storage medium is provided, configured to store a computer program, which enables a computer to perform the method in the first or second aspect described above or each implementations thereof.

In an eighth aspect, a computer program product is provided, including computer program instructions, which enable a computer to perform the method in the first or second aspect described above or each implementations thereof.

In a ninth aspect, a computer program is provided, when the computer program is running on a computer, the computer is enabled to perform the method in the first or second aspect described above or each implementations thereof.

BRIEF DESCRIPTION OF DRAWINGS

FIG. 6 is a schematic flowchart of a wireless communication method according to yet another implementation of the present application.

FIG. 7 is a schematic diagram of a structure of a wireless communication apparatus according to one implementation of the present application.

FIG. 8 is a schematic diagram of a structure of a wireless communication apparatus according to another implementation of the present application.

DETAILED DESCRIPTION

Technical solutions in implementations of the present application will be described below with reference to the drawings in implementations of the present application. It is apparent that the implementations described are a part of implementations of the present application, but not all implementations. Based on the implementations of the present application, all other implementations achieved by a person of ordinary skill in the art without making inventive efforts are within the protection scope of the present application.

The technical solutions of the implementations of the present application may be applied to various communication systems, such as a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, an Advanced Long Term Evolution (LTE-A) system, a New Radio (NR) system, an evolution system of an NR system, an LTE-based access to unlicensed spectrum (LTE-U) system, an NR-based access to unlicensed spectrum (NR-U) system, a Universal Mobile Telecommunications System (UMTS), a Worldwide Interoperability for Microwave Access (WiMAX) communication system, Wireless Local Area Networks (WLANs), Wireless Fidelity (WiFi), a next generation communication system, or other communication systems.

Generally speaking, a quantity of connections supported by a traditional communication system is limited, and the connections are easy to implement. However, with development of communication technologies, a mobile communication system will support not only traditional communication, but also, for example, Device to Device (D2D) communication, Machine to Machine (M2M) communication, Machine Type Communication (MTC), and Vehicle to Vehicle (V2V) communication. The implementations of the present application may also be applied to these communication systems.

Figure 1:
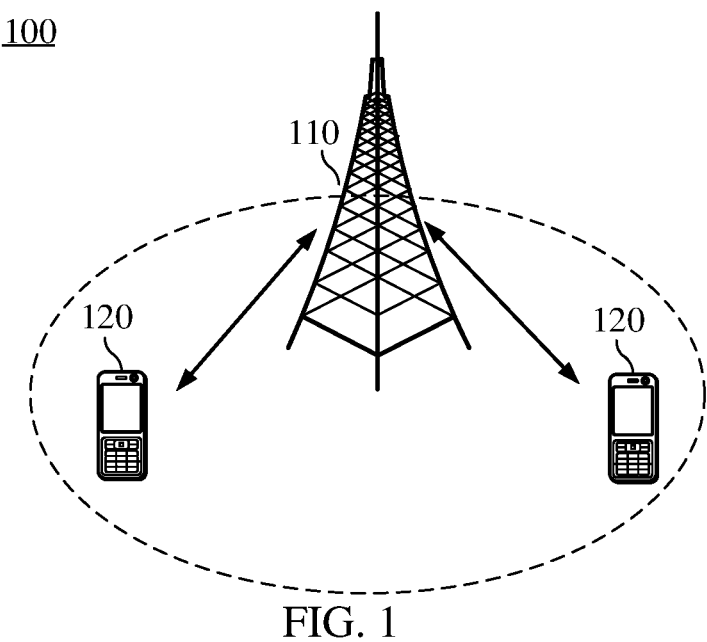
FIG. 1 is a schematic diagram of architecture of a communication system according to an implementation of the present application.

Illustratively, a communication system 100 applied in an implementation of the present application is shown in FIG. 1. The communication system 100 may include a network device 110. The network device 110 may be a device that communicates with terminal devices 120 (or referred to as communication terminals, or terminals). The network device 110 may provide communication coverage for a specific geographical region, and may communicate with terminal devices located within the coverage region. Optionally, the network device 110 may be a Base Transceiver Station (BTS) in a GSM system or CDMA system, or a NodeB (NB) in a WCDMA system, or an Evolutional Node B (eNB or eNodeB) in an LTE system, or a radio controller in a Cloud Radio Access Network (CRAN), or the network device may be a mobile switching center, a relay station, an access point, a vehicle-mounted device, a wearable device, a hub, a switch, a bridge, a router, a network side device in a 5G network, or a network device in a future evolved Public Land Mobile Network (PLMN), etc.

The communication system 100 further includes at least one terminal device 120 located within the coverage range of the network device 110. The "terminal device" as used herein includes, but is not limited to, an apparatus configured to receive/send communication signals via a wired circuit, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a Digital Video Broadcasting Handheld (DVB-H) network, a satellite network, and an Amplitude Modulation-Frequency Modulation (AM-FM) broadcast transmitter; and/or another terminal device; and/or an Internet of Things (IoT) device. A terminal device configured to communicate via a wireless interface may be referred to as "a wireless communication terminal", "a wireless terminal" or "a mobile terminal". Examples of the mobile terminal include, but are not limited to, a satellite or cellular phone; a Personal Communications System (PCS) terminal capable of combining a cellular radio phone with data processing, facsimile, and data communication capabilities; a Personal Digital Assistant (PDA) that may include a radio phone, a pager, internet/intranet access, a Web browser, a memo pad, a calendar, a Global Positioning System (GPS) receiver; and a conventional laptop and/or palmtop receiver or another electronic apparatus including a radio phone transceiver. The terminal device may refer to an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved Public Land Mobile Network (PLMN), or the like.

Optionally, Device to Device (D2D) communication may be established between the terminal devices 120.

Optionally, the 5G system or 5G network may be referred to as a New Radio (NR) system or an NR network.

FIG. 1 illustrates exemplarily one network device and two terminal devices. Optionally, the communication system 100 may include a plurality of network devices, and other numbers of terminal devices may be included within a coverage range of each network device, which is not limited in implementations of the present application.

Optionally, the communication system 100 may also include other network entities, such as a network controller, a mobile management entity, etc., which is not limited in implementations of the present application.

It should be understood that a device with a communication function in a network/system in the implementations of the present application may be referred to as a communication device. Taking the communication system 100 shown in FIG. 1 as an example, the communication device may include a network device 110 and terminal devices 120 which have communication functions, and the network device 110 and the terminal devices 120 may be specific devices described above, which will not be repeated here again. The communication device may also include another device in the communication system 100, such as a network controller, a mobile management entity, or another network entity, which is not limited in implementations of the present application.

It should be understood that the terms "system" and "network" are often used interchangeably herein. The term "and/or" herein describes an association relationship between associated objects only, indicating that there may be three relationships, for example, A and/or B may indicate three cases: A alone, both A and B, and B alone. In addition, the symbol "/" herein generally indicates that there is an "or" relationship between associated objects before and after "/".

Methods of implementations of the present application may be applied to communication of unlicensed spectrums (or shared spectrums), and may also be applied to other communication scenarios, which is not limited specifically in the present application.

An unlicensed spectrum is a spectrum divided by countries and regions, which may be used for communication of radio devices. The spectrum may be considered as a shared spectrum, that is, communication devices in different communication systems may use the spectrum and may not apply for proprietary spectrum authorization from a government, as long as they meet regulatory requirements set on the spectrum by the countries or the regions.

In order to enable various communication systems, which carry out wireless communication using an unlicensed spectrum, to coexist amicably on the spectrum, when a communication device communicates on the unlicensed spectrum, a principle of Listen Before Talk (LBT) may be followed. That is, before sending a signal on a channel of the unlicensed spectrum, the communication device needs to perform channel listening (or referred to as channel detecting) first, and the communication device can send the signal only when a result of channel listening is that the channel is idle; if the result of channel listening performed by the communication device on the unlicensed spectrum is that the channel is busy, the signal cannot be sent. Optionally, a bandwidth of LBT is 20 MHz or an integer multiple of 20 MHz.

In order to understand the present application more clearly, concepts used in communication of an unlicensed spectrum will be set forth below.

Maximum Channel Occupancy Time (MCOT), which may refer to a maximum time length for a channel of an unlicensed spectrum to be allowed for signal transmission after success of LBT. Different channel access solutions have different MCOT. A maximum value of MCOT may be 10 ms, for example. It should be understood that the MCOT is time occupied by signal transmission.

Channel Occupancy Time (COT), which refer to a time length for a channel of an unlicensed spectrum to be used for signal transmission after success of LBT. Signal occupation of the channel may be discontinuous during the time length. One time of COT may not exceed, for example, 20 ms at most, and a time length occupied by signal transmission in the COT does not exceed MCOT.

gNB-initiated COT, also known as COT initiated by a gNB, refers to one time of Channel Occupancy Time obtained by the gNB after success of LBT. In addition to be used for downlink transmission, the gNB-initiated COT may also be used for uplink transmission by UE in a case that a condition is met.

UE-initiated COT, also known as COT initiated by a UE, refers to one time of Channel Occupancy Time obtained by the UE after success of LBT.

Downlink (DL) burst, a group of downlink transmissions (that is, including one or more downlink transmissions) performed by a base station, which is continuous transmissions (that is, there is no gap between multiple downlink transmissions), or there is a gap in the group of downlink transmissions but the gap is less than or equal to a specific duration (for example, 16 µs). If the gap between two downlink transmissions performed by the base station is greater than the specified duration (for example, 16 µs), then it may be considered that the two downlink transmissions belong to two DL bursts.

Uplink (UL) burst, a group of uplink transmissions (that is, including one or more uplink transmissions) performed by a UE, which is continuous transmissions (that is, there is no gap between multiple uplink transmissions), or there is a gap in the group of uplink transmissions but the gap is less than or equal to a specific duration (for example, 16 µs). If the gap between two downlink transmissions performed by the UE is greater than the specified duration (for example, 16 µs), then it may be considered that the two uplink transmissions belong to two UL bursts.

In implementations of the present application, a communication device may perform an LBT operation using a corresponding channel access solution. For convenience of understanding, several channel access solutions will be described below.

A mode in which the communication device obtains channel occupancy may be a Load Based Equipment (LBE) channel access mode, that is, the communication device may perform LBT on a shared channel after a service arrives, and start a transmission on the shared channel after success of LBT; the mode may also be a Frame Based Equipment (FBE) channel access mode, that is, the communication device performs LBT on a shared channel periodically. The FBE channel access mode may also be referred to as a semi-static channel access mode.

The LBE channel access mode may include multiple different channel access solutions.

(1) Type1 Channel Access

A channel detection mode of a communication device is multi-slot channel detection based on random backoff adjusted according to a Contention Window size. Specifically, under Type1 channel access, different Channel Access Priority Classes (CAPCs) may be included according to priorities of transmission services. Tables 1 and 2 are two examples of channel access parameters corresponding to different Channel Access Priority Classes respectively. Optionally, Table 1 is used for Type1 channel access of a network device and Table 2 is used for Type1 channel access of a terminal device. The smaller the value of p (or the smaller the value of CAPC) is, the higher the Channel Access Priority Class is.

TABLE 1

| Channel Access Priority Class (p) | $m_p$ | $CW_{min},p$ | $CW_{max},p$ | $T_{mcor},p$(ms) | Allowable value of $CW_p$ |
|---|---|---|---|---|---|
| 1 | 1 | 3 | 7 | 2 | {3, 7} |
| 2 | 1 | 7 | 15 | 3 | {7, 15} |
| 3 | 3 | 15 | 63 | 8 or 10 | {15, 31, 63} |
| 4 | 7 | 15 | 1023 | 8 or 10 | {15, 31, 63, 127, 255, 511, 1023} |

TABLE 2

| Channel Access Priority Class (p) | $m_p$ | $CW_{min},p$ | $CW_{max},p$ | $T_{mcor},p$(ms) | Allowable value of $CW_p$ |
|---|---|---|---|---|---|
| 1 | 2 | 3 | 7 | 2 | {3, 7} |
| 2 | 2 | 7 | 15 | 4 | {7, 15} |
| 3 | 3 | 15 | 1023 | 6 or 10 | {15, 31, 63, 127, 255, 511,1023} |
| 4 | 7 | 15 | 1023 | 6 or 10 | {15, 31, 63, 127, 255, 511, 1023} |

In the above Table 1 or 2, $m_p$ refers to a quantity of backoff slots corresponding to a Channel Access Priority Class, $CW_p$ refers to a size of a Contention Window corresponding to a Channel Access Priority Class, $CW_{min},p$ refers to a minimum value of $CW_p$ corresponding to a Channel Access Priority Class, $CW_{max},p$ refers to a maximum value of $CW_p$ corresponding to a Channel Access Priority Class, and $T_{mcor},p$ refers to a maximum channel occupancy time length corresponding to a Channel Access Priority Class.

(2) Type2A Channel Access

A channel detection mode of a communication device is single slot channel detection of 25 microseconds. Specifically, under the Type2A channel access, the communication device may perform channel detection of 25 microseconds before starting of transmission, and then perform transmission after success of the channel detection.

(3) Type2B Channel Access

A channel detection mode of a communication device is single slot channel detection of 16 microseconds. Specifically, under the Type2B channel access, the communication device may perform channel detection of 16 microseconds before starting of transmission, and then perform transmission after success of the channel detection. Optionally, a size of a gap between a starting position of the transmission and an end position of a previous transmission is 16 microseconds.

(4) Type2C Channel Access

A communication device performs transmission instead of channel detection after a gap ends. Specifically, under the Type2C channel access, the communication device may perform transmission directly, wherein a size of a gap between a starting position of the transmission and an end position of a previous transmission is less than or equal to 16 microseconds. Optionally, a length of the transmission under Type2C channel access does not exceed 584 microseconds.

Channel access solutions applied in different transmission scenarios are different, and channel access solutions applied to different signals or channels are also different. When a network device initiates COT, resources in the COT may be used for a UE for uplink transmission.

Figure 2:
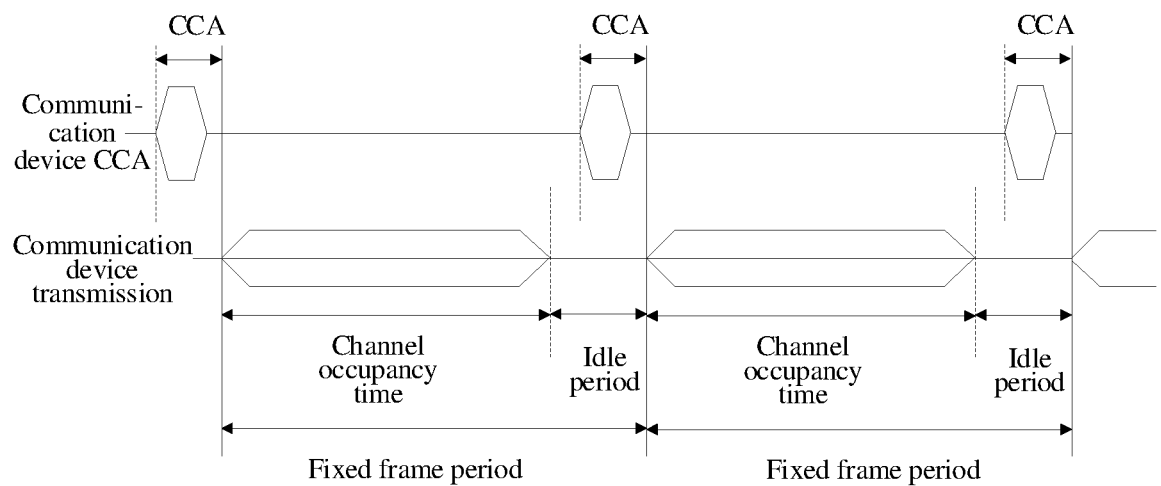
FIG. 2 is a schematic diagram of a frame-based channel access mode according to an implementation of the present application.

For a frame-based equipment (FBE) channel access mode, as shown in FIG. 2, in this mode, frame structures occur periodically. A fixed frame period (a length of which does not exceed a preset value such as 10 ms), channel occupancy time (a length of which does not exceed 95% of the fixed frame period), and an idle time (a length of which is at least 5% of the channel occupancy time, a minimum value of which is 100 μs, and which is located at an end of the fixed frame period) are included in one frame structure. A network device performs an LBT (which, for example, may be single slot channel detection or single slot Clear Channel Assessment (CCA)) on a shared channel in a gap time. If the LBT is successful, the channel occupancy time in a next fixed frame period may be used for transmitting a signal; if the LBT is failed, the channel occupancy time in a next fixed frame period cannot be used for transmitting a signal. In other words, channel resources which may be used by a communication device for service transmission occur periodically.

In an NR-U system, when a terminal device is scheduled for transmission of a PUSCH or PUCCH, a network device may indicate a channel access solution corresponding to the PUSCH or PUCCH through DCI carrying a UL grant or DL grant. Indication of a specific channel access solution is shown as follows.

(1) A non-backoff UL grant for scheduling a PUSCH transmission (for example, DCI format 0_1)

① A first indication set is configured through a high-layer parameter, and the first indication set includes at least one item of jointly coded channel access type, an Extended Cyclic Prefix (ECP) length, or a CAPC.

② The non-backoff UL grant includes first indication information, which is used for determining the jointly coded channel access type, the ECP length, and the CAPC from the first indication set.

③ The channel access type, the ECP length, and the CAPC are used for the PUSCH transmission.

④ The first indication information includes at most 6 bits.

(2) A non-backoff DL grant for scheduling a Physical Downlink Shared Channel (PDSCH) transmission (for example, DCI format 1_1)

① A second indication set is configured through a high-layer parameter, and the second indication set includes at least one item of jointly coded channel access type, an Extended Cyclic Prefix (ECP) length, or a CAPC.

② The non-backoff uplink grant includes second indication information, which is used for determining the jointly coded channel access type and the ECP length from the second indication set.

③ The channel access type and the ECP length are used for a PUCCH transmission, wherein the PUCCH may carry Hybrid Automatic Repeat reQuest-Acknowledgement (HARQ-ACK) information corresponding to a PDSCH. Optionally, CAPC=1.

④ The second indication information includes at most 4 bits.

(3) A backoff UL grant for scheduling a PUSCH transmission (for example, DCI format 0_0)

① The backoff uplink grant includes third indication information, which is used for determining a jointly coded channel access type and an ECP length from a third indication set.

② The third indication set is preset, as shown in Table 3 below.

③ The channel access type and the ECP length are used for the PUSCH transmission. Optionally, a terminal device selects a CAPC by itself, for example, the terminal device selects a CAPC by itself according to a priority of a service carried in an uplink channel.

④ The third indication information includes 2 bits.

(4) A backoff DL grant for scheduling a PDSCH transmission (for example, DCI format 1_0)

① The backoff downlink grant includes fourth indication information, which is used for determining a jointly coded channel access type and an ECP length from the third indication set.

② The third indication set is preset, as shown in Table 3 below.

③ The channel access type and the ECP length are used for the PUCCH transmission, herein a PUCCH may carry HARQ-ACK information corresponding to a PDSCH. Optionally, CAPC=1.

④ The fourth indication information includes 2 bits.

TABLE 3

| Indication information | Channel access type | ECP length |
| --- | --- | --- |
| 0 | Type2C channel access | C2* symbol length -16 μs-TA |
| 1 | Type2A channel access | C3* symbol length -25 μs-TA |
| 2 | Type2A channel access | C1* symbol length -25 μs |
| 3 | Type1 channel access | 0 |

Values of C2 and C3 are preset or are configured through a high-layer parameter, and a value of C1 is preset.

In addition, when a terminal device receives a UL grant or DL grant sent by a network device, the UL grant or DL grant indicates that a channel access type corresponding to a PUSCH or PUCCH is Type1 channel access, if the terminal device can determine that the PUSCH or PUCCH belongs to be within channel occupancy time of the network device, for example, if the terminal device receives a DCI format 2_0 sent by the network device and determines that the PUSCH or PUCCH belongs to be within the channel occupancy time of the network device according to the DCI format 2_0, then the terminal device may determine that the channel access type corresponding to the PUSCH or PUCCH is Type2A channel access instead of Type1 channel access.

If the terminal device needs to transmit at least two uplink channels on a shared channel in a case of scheduling through one piece of DCI, how to determine channel access parameters of the at least two channels needs to be solved.

Therefore, an implementation of the present application provides a following solution, channel access parameters of at least two channels on a shared channel in a case of scheduling through one piece of DCI may be determined, thereby ensuring fair sharing of resources on the shared channel.

The solution provided by an implementation of the present application will be described below in detail with reference to FIG. 3.

Figure 3:
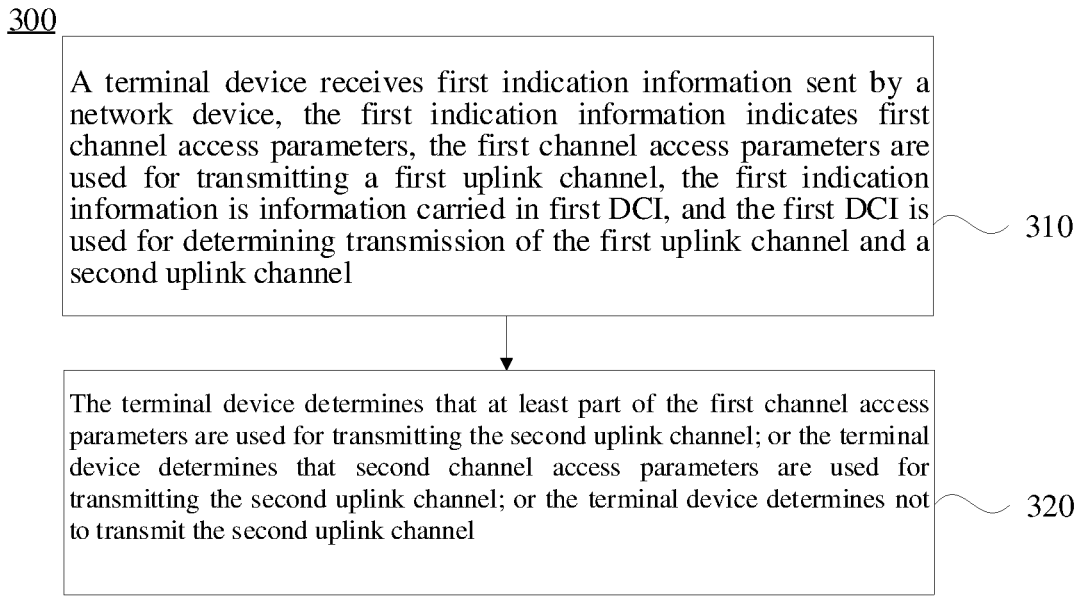
FIG. 3 is a schematic flowchart of a wireless communication method according to one implementation of the present application.

As shown in FIG. 3, which is a schematic flowchart of a wireless communication method 300 according to one implementation of the present application, the wireless communication method 300 may include acts 310-320.

In 310, a terminal device receives first indication information sent by a network device, herein the first indication information indicates first channel access parameters, the first channel access parameters are used for transmitting a first uplink channel, the first indication information is information carried in first DCI, and the first DCI is used for determining transmission of the first uplink channel and a second uplink channel.

That the first channel access parameters in an implementation of the present application are used for transmitting the first uplink channel may mean that the first channel access parameters are used for performing channel detection. In one mode, if the channel detection performed based on the first channel access parameters is successful, the terminal device may determine that the first channel access parameters are used for transmitting the first uplink channel; if the channel detection performed based on the first channel access parameters is failed, the terminal device determines that the first uplink channel cannot be transmitted based on the first channel access parameters.

In an implementation of the present application, the first indication information sent by the network device, received by the terminal device, may be the information carried in the first DCI, so that the terminal device may determine the transmission of the first uplink channel and the second uplink channel based on the first indication information.

In act 320, the terminal device determines that at least part of the first channel access parameters are used for transmitting the second uplink channel; or the terminal device determines that second channel access parameters are used for transmitting the second uplink channel; or the terminal device determines not to transmit the second uplink channel.

The second uplink channel in an implementation of the implementation of the present application may include a PUSCH, a PUCCH, or a Physical Random Access Channel (PRACH), etc. Therefore, the terminal device may determine that the at least part of the first channel access parameters or the second channel access parameters are used for transmitting one of the PUSCH, the PUCCH, or the PRACH, or determine not to transmit the PUSCH, the PUCCH, or the PRACH.

It should be understood that in some implementations, the second uplink channel in an implementation of the present application may also be a second uplink signal, which may include a channel Sounding Reference Signal (SRS) or Channel State Information (CSI).

It should also be understood that in an implementation of the present application, in a case that multiple (more than two) channels on a shared channel are scheduled through one piece of DCI, the terminal device may also determine that the multiple channels are transmitted through at least part of channel access parameters in the first uplink channel or the second channel access parameters, or determine not to transmit the multiple channels.

In an implementation of the present application, in a case that the first channel access parameters indicated by the first indication information are used for transmitting the first uplink channel, the terminal device may determine that channel access parameters used for transmitting the second uplink channel are part of the first channel access parameters or the second channel access parameters or may not determine channel access parameters used for transmitting the second uplink channel.

In an implementation of the present application, in a case that the terminal device determines that the at least part of the first channel access parameters or the second channel access parameters are not used for transmitting the second uplink channel, the terminal device may also transmit the second uplink channel in other ways.

In some implementations, the network device may also send one piece of indication information to the terminal device, and the indication information may be used for instructing the terminal device to transmit the second uplink channel using the at least part of the first channel access parameters or the second channel access parameters or not to transmit the second uplink channel.

In the wireless communication method according to an implementation of the present application, if at least two channels on a shared channel are scheduled through one piece of DCI, the terminal device may determine that the second uplink channel is transmitted through the at least part of channel access parameters in the first uplink channel or the second channel access parameters, or determine not to transmit the second uplink channel, thereby ensuring fair sharing of resources on the shared channel.

It is noted above that the first channel access parameters indicated by the first indication information received by the terminal device may be used for transmitting the second uplink channel. Parameters included in the first channel access parameters will be described specifically below.

Optionally, in some implementations, the first indication information indicating the first channel access parameters includes one of following cases: the first indication information indicates a first channel access type, a first ECP length, or a first CAPC; and the first indication information indicates a first channel access type and a first ECP length.

The first channel access type in an implementation of the present application may be one of Type1 channel access, Type2A channel access, Type2B channel access, or Type2C channel access.

In some implementations, if the terminal device receives uplink grant information sent by the network device, the uplink grant information may include first indication information in an implementation of the present application, and first channel access parameters indicated by the first indication information may include a first channel access type, a first ECP length, and a first CAPC; if the terminal device receives downlink grant information sent by the network device, the downlink grant information may include first indication information in an implementation of the present application, and first channel access parameters indicated by the first indication information may include a first channel access type and a first ECP length.

Optionally, in some implementations, the first channel access parameters include at least one of the first channel access type, the first ECP length, or the first CAPC, and the terminal device transmits the second uplink channel according to the at least part of the first channel access parameters including: the terminal device transmits the second uplink channel according to at least one of the first channel access type, the first ECP length, or the first CAPC.

In an implementation of the present application, if the first channel access parameters include at least one of the first channel access type, the first ECP length, or the first CAPC, the terminal device may transmit the second uplink channel according to at least one of the first channel access type, the first ECP length, or the first CAPC.

In other words, the terminal device may transmit the second uplink channel according to one of the first channel access type, the first ECP length, or the first CAPC; the terminal device may also transmit the second uplink channel according to the first channel access type and the first ECP length; the terminal device may also transmit the second uplink channel according to the first channel access type, the first ECP length, and the first CAPC.

Taking a first uplink channel being a first PUSCH and a second uplink channel being a first SRS as an example, in an implementation of the present application, if the terminal device receives uplink grant information transmitted in a DCI format 0_1, the uplink grant information may be used for scheduling transmission of the first PUSCH and may trigger aperiodic transmission of the first SRS, and the grant information may include first indication information, which may be used for determining first channel access parameters in the first uplink channel from a first indication set. The first channel access parameters may be used for transmitting the first uplink channel, and may include a first channel access type, a first ECP length, and a first CAPC.

If the first PUSCH and the first SRS belong to different uplink bursts, the terminal device may transmit the first SRS based on at least part of the first channel access parameters. Specifically, for example, in one implementation, the terminal device may transmit the first SRS based on the first channel access type in the first channel access parameters. If the first channel access type in the first channel access parameters is Type1 channel access, the terminal device may transmit the first SRS based on the Type1 channel access; if the first channel access type in the first channel access parameters is Type2A channel access, the terminal device may transmit the first SRS based on the Type2A channel access; if the first channel access type in the first channel access parameters is Type2B channel access, the terminal device may transmit the first SRS based on the Type2B channel access; if the first channel access type in the first channel access parameters is Type2C channel access, the terminal device may transmit the first SRS based on the Type2C channel access.

In another implementation, the terminal device may transmit the first SRS based on the first channel access type and the first ECP length in the first channel access parameters. If the first channel access type in the first channel access parameters is Type1 channel access and the first ECP length is 0, the terminal device may transmit the first SRS based on a channel access type which is the Type1 channel access and an ECP length which is 0; if the first channel access type in the first channel access parameters is Type2A channel access and the first ECP length is a, the terminal device may transmit the first SRS based on a channel access type which is the Type2A channel access and an ECP length which is a, herein the first ECP length may be determined according to Table 3 above; if the first channel access type in the first channel access parameters is Type2B channel access and the first ECP length is b, the terminal device may transmit the first SRS based on a channel access type which is the Type2B channel access and an ECP length which is b, herein the first ECP length may also be determined according to Table 3 above; if the first channel access type in the first channel access parameters is Type2C channel access and the first ECP length is c, the terminal device may transmit the first SRS based on a channel access type which is the Type2C channel access and an ECP length which is c, herein likewise, the first ECP length may also be determined according to Table 3 above.

In yet another implementation, the terminal device may transmit the first SRS based on the first ECP length in the first channel access parameters. If the first ECP length in the first channel access parameters is 0, the terminal device may transmit the first SRS based on an ECP length which is 0.

Similarly, taking a first uplink channel being a first PUCCH and a second uplink channel being the first SRS as an example, in an implementation of the present application, the terminal device receives downlink grant information transmitted in a DCI format 1_0, the downlink grant information is used for scheduling transmission of a first PDSCH and may trigger aperiodic transmission of the first SRS, and the grant information may include first indication information, which may be used for determining first channel access parameters in the first uplink channel from a first indication set. The first channel access parameters may be used for transmitting the first uplink channel, and may include a first channel access type and a first ECP length.

If the first PUCCH and the first SRS belong to different uplink bursts, the terminal device may transmit the first SRS based on at least part of the first channel access parameters.

Specifically, for example, in one implementation, the terminal device may transmit the first SRS based on the first channel access type in the first channel access parameters. If the first channel access type in the first channel access parameters is Type1 channel access, the terminal device may transmit the first SRS based on the Type1 channel access; if the first channel access type in the first channel access parameters is Type2A channel access, the terminal device may transmit the first SRS based on the Type2A channel access; if the first channel access type in the first channel access parameters is Type2B channel access, the terminal device may transmit the first SRS based on the Type2B channel access; if the first channel access type in the first channel access parameters is Type2C channel access, the terminal device may transmit the first SRS based on the Type2C channel access.

In another implementation, the terminal device may transmit the first SRS based on the first channel access type and the first ECP length in the first channel access parameters. If the first channel access type in the first channel access parameters is Type1 channel access and the first ECP length is 0, the terminal device may transmit the first SRS based on a channel access type which is the Type1 channel access and an ECP length which is 0; if the first channel access type in the first channel access parameters is Type2A channel access and the first ECP length is a, the terminal device may transmit the first SRS based on a channel access type which is the Type2A channel access and an ECP length which is a, wherein the first ECP length may be determined according to Table 3 above; if the first channel access type in the first channel access parameters is Type2B channel access and the first ECP length is b, the terminal device may transmit the first SRS based on a channel access type which is the Type2B channel access and an ECP length which is b, herein the first ECP length may also be determined according to Table 3 above; if the first channel access type in the first channel access parameters is Type2C channel access and the first ECP length is c, the terminal device may transmit the first SRS based on a channel access type which is the Type2C channel access and an ECP length which is c, herein the first ECP length may also be determined according to Table 3 above.

In yet another implementation, the terminal device may transmit the first SRS based on the first ECP length in the first channel access parameters. If the first ECP length in the first channel access parameters is 0, the terminal device may transmit the first SRS based on an ECP length which is 0.

Similarly, taking a first uplink channel being the first PUSCH and a second uplink channel being a second PUSCH as an example.

Taking the first uplink channel being the first PUSCH and the second uplink channel being the second PUSCH as an example, in an implementation of the present application, the terminal device receives uplink grant information transmitted in a DCI format 0_1, the uplink grant information is used for scheduling transmission of the first PUSCH and the second PUSCH, and the grant information may include first indication information, which may be used for determining first channel access parameters in the first uplink channel from a first indication set. The first channel access parameters may be used for transmitting the first uplink channel, and may include a first channel access type, a first ECP length, and a first CAPC.

Specifically, for example, in one implementation, the terminal device may transmit the second PUSCH based on the first channel access type in the first channel access parameters. If the first channel access type in the first channel access parameters is Type1 channel access, the terminal device may transmit the second PUSCH based on the Type1 channel access; if the first channel access type in the first channel access parameters is Type2A channel access, the terminal device may transmit the second PUSCH based on the Type2A channel access; if the first channel access type in the first channel access parameters is Type2B channel access, the terminal device may transmit the second PUSCH based on the Type2B channel access; if the first channel access type in the first channel access parameters is Type2C channel access, the terminal device may transmit the second PUSCH based on the Type2C channel access.

In another implementation, the terminal device may transmit the second PUSCH based on the first channel access type and the first ECP length in the first channel access parameters. If the first channel access type in the first channel access parameters is Type1 channel access and the first ECP length is 0, the terminal device may transmit the second PUSCH based on a channel access type which is the Type1 channel access and an ECP length which is 0; if the first channel access type in the first channel access parameters is Type2A channel access and the first ECP length is a, the terminal device may transmit the second PUSCH based on a channel access type which is the Type2A channel access and an ECP length which is a, herein the first ECP length may be determined according to Table 3 above; if the first channel access type in the first channel access parameters is Type2B channel access and the first ECP length is b, the terminal device may transmit the second PUSCH based on a channel access type which is the Type2B channel access and an ECP length which is b, herein the first ECP length may also be determined according to Table 3 above; if the first channel access type in the first channel access parameters is Type2C channel access and the first ECP length is c, the terminal device may transmit the second PUSCH based on a channel access type which is the Type2C channel access and an ECP length which is c, herein the first ECP length may also be determined according to Table 3 above.

In yet another implementation, the terminal device may transmit the second PUSCH based on the first ECP length in the first channel access parameters. If the first ECP length in the first channel access parameters is 0, the terminal device may transmit the second PUSCH based on an ECP length which is 0.

It is mentioned above that the terminal device may transmit the second uplink channel according to the first channel access type. In such a case, an ECP length used for transmitting the second uplink channel may be determined by the terminal device, which will be described specifically below.

Optionally, in some implementations, the terminal device transmits the second uplink channel according to the first channel access type, and the method further including: the terminal device determines that an ECP length of the second uplink channel is 0.

In an implementation of the present application, in a case that the terminal device determines to transmit the second uplink channel according to the first channel access type in the first access parameters, the terminal device may determine that an ECP length of the second uplink channel is 0. In other words, if the first channel access type in the first channel access parameters is Type1 channel access, the terminal device may transmit the second uplink channel based on Type1 channel access while determining that an ECP length used for transmitting the second uplink channel is 0.

It is mentioned above that the terminal device may transmit the second uplink channel according to the first ECP length. In such a case, a channel access type used for transmitting the second uplink channel may be determined by the terminal device, which will be described specifically below.

Figure 4:
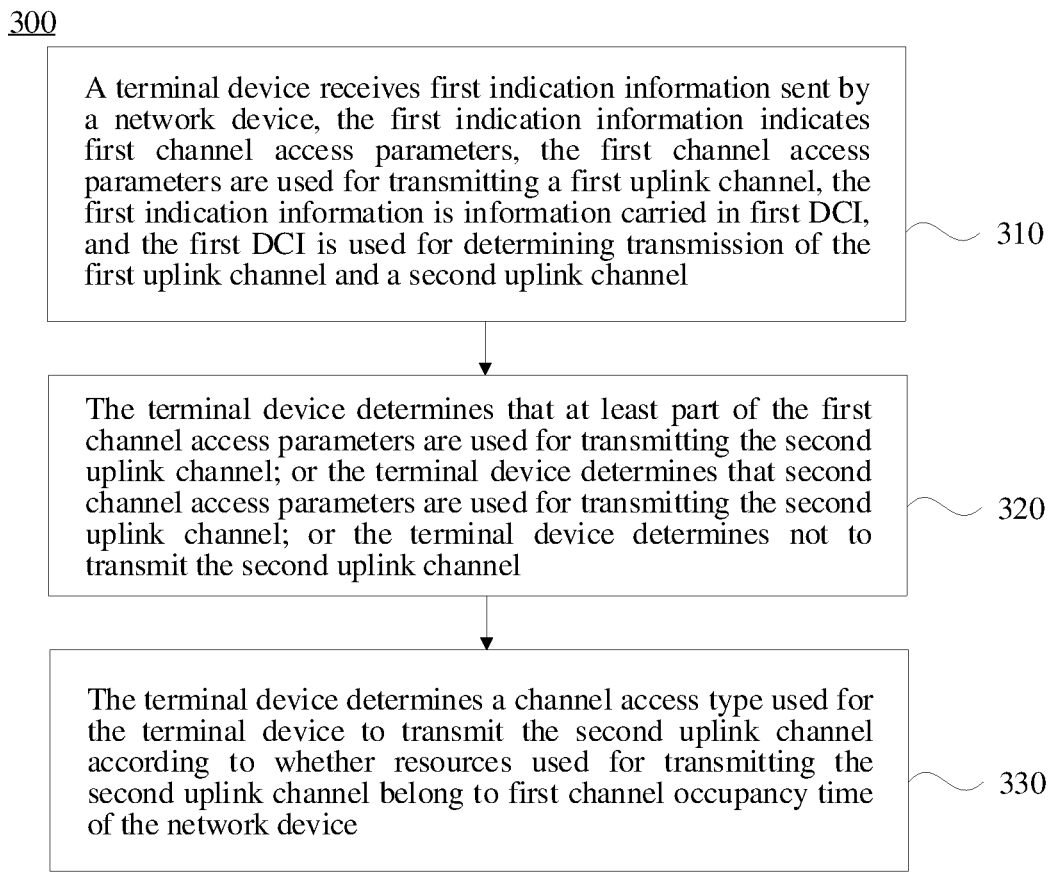
FIG. 4 is a schematic flowchart of a wireless communication method according to another implementation of the present application.

Optionally, in some implementations, as shown in FIG. 4, which is a schematic flowchart of a wireless communication method 300 according to another implementation of the present application, the method may further include act 330.

In act 330, the terminal device determines a channel access type used for the terminal device to transmit the second uplink channel according to whether resources used for transmitting the second uplink channel belong to first channel occupancy time of the network device.

Optionally, in some implementations, the terminal device determining the channel access type used for the terminal device to transmit the second uplink channel according to whether the resources used for transmitting the second uplink channel belong to the first channel occupancy time of the network device, includes: if the resources used for transmitting the second uplink channel belong to the first channel occupancy time of the network device, the terminal device determining that the channel access type used for transmitting the second uplink channel is Type2A channel access or one of Type2A channel access, Type2B channel access, or Type2C channel access; or if the resources used for transmitting the second uplink channel do not belong to the first channel occupancy time of the network device, the terminal device determining that the channel access type used for transmitting the second uplink channel is Type1 channel access.

In an implementation of the present application, in a case that the terminal device transmits the second uplink channel according to the first ECP length, the terminal device may determine the channel access type used for transmitting the second uplink channel according to whether the resources used for transmitting the second uplink channel belong to the first channel occupancy time.

Likewise, taking the first uplink channel being the first PUSCH and the second uplink channel being the first SRS as an example, if the first channel occupancy time of the network device is 2 ms and resources used for transmitting the first SRS belong to the first channel occupancy time of the network device, the terminal device may determine that a channel access type used for transmitting the first SRS is Type2A channel access or one of Type2A channel access, Type2B channel access, or Type2C channel access; if the resources used for transmitting the first SRS do not belong to the first channel occupancy time of the network device, the terminal device may determine that a channel access type used for transmitting the first SRS is Type1 channel access.

In an implementation of the present application, if a channel access type used by the terminal device is not indicated in the first indication information, the terminal device may determine to transmit the first SRS using Type2A channel access. If the channel access type used by the terminal device is indicated in the first indication information, the terminal device may determine the channel access type for transmitting the first SRS according to indication in the first indication information. For example, if it is indicated in the first indication information that a channel access type used by the terminal device is Type2A channel access, the terminal device may determine that a channel access type for transmitting the first SRS is the Type2A channel access; if it is indicated in the first indication information that a channel access type used by the terminal device is Type2B channel access, the terminal device may determine that a channel access type for transmitting the first SRS is the Type2B channel access; if it is indicated in the first indication information that a channel access type used by the terminal device is Type2C channel access, the terminal device may determine that a channel access type for transmitting the first SRS is the Type2C channel access.

In an implementation of the present application, assuming that the terminal device determines that a channel access type for transmitting the first SRS is Type1 channel access, before the terminal device has not transmitted the first SRS based on the determined Type1 channel access, if the terminal device receives another piece of grant information sent by the network device and resources for transmitting the first SRS belong to second channel occupancy time of the network device, the terminal device may convert the channel access type used for transmitting the first SRS from Type1 channel access to Type2A channel access, so that the terminal device may transmit the first SRS based on the Type2A channel access. Similarly, taking the first uplink channel being the first PUCCH and the second uplink channel being the first SRS as an example, if first channel occupancy time of the network device is 2 ms and resources used for transmitting the first SRS belong to the first channel occupancy time of the network device, the terminal device may determine that a channel access type for transmitting the first SRS is Type2A channel access or one of Type2A channel access, Type2B channel access, or Type2C channel access; if the resources for transmitting the first SRS do not belong to the first channel occupancy time of the network device, the terminal device may determine that the channel access type for transmitting the first SRS is Type1 channel access.

In an implementation of the present application, if the channel access type used by the terminal device is not indicated in the first indication information, the terminal device determines to transmit the first SRS using Type2A channel access. If the channel access type used by the terminal device is indicated in the first indication information, the terminal device may determine the channel access type for transmitting the first SRS according to indication in the first indication information. For example, if it is indicated in the first indication information that the channel access type used by the terminal device is Type2A channel access, the terminal device may determine that the channel access type for transmitting the first SRS is the Type2A channel access; if it is indicated in the first indication information that the channel access type used by the terminal device is Type2B channel access, the terminal device may determine that the channel access type for transmitting the first SRS is the Type2B channel access; if it is indicated in the first indication information that the channel access type used by the terminal device is Type2C channel access, the terminal device may determine that the channel access type for transmitting the first SRS is the Type2C channel access.

In an implementation of the present application, assuming that the terminal device determines that the channel access type for transmitting the first SRS is Type1 channel access, before the terminal device has not transmitted the first SRS based on the determined Type1 channel access, if the terminal device receives another piece of grant information sent by the network device and resources for transmitting the first SRS belong to second channel occupancy time of the network device, the terminal device may convert the channel access type for transmitting the first SRS from Type1 channel access to Type2A channel access, so that the terminal device may transmit the first SRS based on the Type2A channel access.

Similarly, taking the first uplink channel being the first PUSCH and the second uplink channel being the second PUSCH as an example, if first channel occupancy time of the network device is 2 ms and resources used for transmitting the second PUSCH belong to the first channel occupancy time of the network device, the terminal device may determine that the channel access type for transmitting the second PUSCH is Type2A channel access or one of Type2A channel access, Type2B channel access, or Type2C channel access; if the resources used for transmitting the second PUSCH do not belong to the first channel occupancy time of the network device, the terminal device may determine that the channel access type for transmitting the second PUSCH is Type1 channel access.

In an implementation of the present application, if the channel access type used by the terminal device is not indicated in the first indication information, the terminal device determines to transmit the second PUSCH using Type2A channel access. If the channel access type used by the terminal device is indicated in the first indication information, the terminal device may determine the channel access type used for transmitting the second PUSCH according to indication in the first indication information. For example, if it is indicated in the first indication information that the channel access type used by the terminal device is Type2A channel access, the terminal device may determine that the channel access type for transmitting the second PUSCH is the Type2A channel access; if it is indicated in the first indication information that the channel access type used by the terminal device is Type2B channel access, the terminal device may determine that the channel access type for transmitting the second PUSCH is the Type2B channel access; if it is indicated in the first indication information that the channel access type used by the terminal device is Type2C channel access, the terminal device may determine that the channel access type for transmitting the second PUSCH is the Type2C channel access.

In an implementation of the present application, assuming that the terminal device determines that the channel access type for transmitting the second PUSCH is Type1 channel access, before the terminal device has not transmitted the second PUSCH based on the determined Type1 channel access, if the terminal device receives another piece of grant information sent by the network device and resources for transmitting the second PUSCH belong to second channel occupancy time of the network device, the terminal device may convert the channel access type for transmitting the second PUSCH from Type1 channel access to Type2A channel access, so that the terminal device may transmit the second PUSCH based on the Type2A channel access.

Optionally, in some implementations, the method further includes: the terminal device determining that a value of a CAPC used for transmitting the second uplink channel is 1; or the terminal device selecting a CAPC used for transmitting the second uplink channel by itself according to the second uplink channel.

In an implementation of the present application, in a case that the terminal device determines to transmit the second uplink channel according to the first channel access type and/or the first ECP length included in the first channel access parameters, the value of the CAPC used for the terminal device to transmit the second uplink channel may be 1 or may be selected by the terminal device itself.

Likewise, taking the first uplink channel being the first PUSCH and the second uplink channel being the first SRS as an example, if the terminal device determines to transmit the first SRS according to the first channel access type and/or the first ECP length, the terminal device may transmit the first SRS based on a CAPC with a value of 1; or the terminal device may select a value of a CAPC for transmitting the first SRS by itself. For example, a CAPC with a value of 1 or 2 or 3 or 4 may be selected for transmitting the first SRS, which is not limited specifically in the present application.

Similarly, if the first uplink channel is the first PUCCH and the second uplink channel is the first SRS, or the first uplink channel is the first PUSCH and the second uplink channel is the second PUSCH, the terminal device may also determine that a value of a CAPC used for transmitting the second uplink channel may be 1 or may be selected by the terminal device itself.

It is worth noting that if the second uplink channel is CSI and the terminal device determines that a CAPC for transmitting the second uplink channel is 2 according to the first channel access parameters, the terminal device may still transmit the CSI based on a CAPC with a value of 1.

It is described above that the terminal device may transmit the second uplink channel based on the at least part of the first channel access parameters. In some cases, the terminal device may transmit the second uplink channel based on the at least part of the first channel access parameters only when a condition is met, which will be described specifically below.

Optionally, in some implementations, the terminal device transmits the second uplink channel or not transmitting the second uplink channel according to the at least part of the first channel access parameters or the second channel access parameters, including: in a case that a first preset condition is met, the terminal device transmits the second uplink channel according to the at least part of the first channel access parameters; or in a case that the first preset condition is not met, the terminal device transmits the second uplink channel according to the second channel access parameters.

Optionally, in some implementations, the first preset condition includes at least one of following conditions: the channel access type in the first channel access parameters is at least one of Type2A channel access, Type2B channel access, or Type2C channel access; the second uplink channel belongs to channel occupancy time of the network device; the first uplink channel and the second uplink channel belong to a same uplink burst, the second uplink channel is located after the first uplink channel in a time domain, and channel access of the first uplink channel is failed.

Taking the first uplink channel being the first PUSCH and the second uplink channel being the first SRS as an example, in an implementation of the present application, if the channel access type in the first channel access parameters is Type2A channel access or Type2B channel access or Type2C channel access, the terminal device may transmit the first SRS based on the at least part of the first channel access parameters. For example, the terminal device may transmit the first SRS based on the first channel access type and/or the first ECP length in the first channel access parameters; the terminal device may also transmit the first SRS based on the first channel access type, the first ECP length, and the first CAPC in the first channel access parameters.

Or, if the first SRS belongs to first channel occupancy time of the network device, the terminal device may transmit the first SRS based on the at least part of the first channel access parameters. For example, the terminal device may transmit the first SRS based on the first channel access type and/or the first ECP length in the first channel access parameters; the terminal device may also transmit the first SRS based on the first channel access type, the first ECP length, and the first CAPC in the first channel access parameters.

Or, if the channel access type in the first channel access parameters is Type2A channel access or Type2B channel access or Type2C channel access and the first SRS belongs to the first channel occupancy time of the network device, the terminal device may transmit the first SRS based on the at least part of the first channel access parameters. For example, the terminal device may transmit the first SRS based on the first channel access type and/or the first ECP length in the first channel access parameters; the terminal device may also transmit the first SRS based on the first channel access type, the first ECP length, and the first CAPC in the first channel access parameters.

Or, if the first PUSCH and the first SRS belong to a same uplink burst, the first SRS is located after the first PUSCH in a time domain and channel access of the first PUSCH is failed, the terminal device may transmit the first SRS based on the at least part of the first channel access parameters. Specifically, assuming that the first SRS is located after the first PUSCH in the time domain and the first SRS and the first PUSCH belong to the same uplink burst, the terminal device may transmit the first PUSCH based on the first channel access parameters, and if access of the first PUSCH is failed, the terminal device may transmit the first SRS based on the at least part of the first channel access parameters.

Similarly, taking the first uplink channel being the first PUCCH and the second uplink channel being the first SRS as an example, in an implementation of the present application, if the channel access type in the first channel access parameters is Type2A channel access or Type2B channel access or Type2C channel access, the terminal device may transmit the first SRS based on the at least part of the first channel access parameters. For example, the terminal device may transmit the first SRS based on a first channel access type and/or an ECP length in the first channel access parameters; the terminal device may also transmit the first SRS based on the first channel access type, the first ECP length, and the first CAPC in the first channel access parameters.

Or, if the first SRS belongs to the first channel occupancy time of the network device, the terminal device may transmit the first SRS based on the at least part of the first channel access parameters. For example, the terminal device may transmit the first SRS based on the first channel access type and/or the first ECP length in the first channel access parameters; the terminal device may also transmit the first SRS based on the first channel access type, the first ECP length, and the first CAPC in the first channel access parameters.

Or, if the channel access type in the first channel access parameters is Type2A channel access or Type2B channel access or Type2C channel access and the first SRS belongs to the first channel occupancy time of the network device, the terminal device may transmit the first SRS based on the at least part of the first channel access parameters. For example, the terminal device may transmit the first SRS based on the first channel access type and/or the first ECP length in the first channel access parameters; the terminal device may also transmit the first SRS based on the first channel access type, the first ECP length, and the first CAPC in the first channel access parameters.

Or, if the first PUCCH and the first SRS belong to a same uplink burst, the first SRS is located after the first PUCCH in a time domain and channel access of the first PUCCH is failed, the terminal device may transmit the first SRS based on the at least part of the first channel access parameters. Specifically, assuming that the first SRS is located after the first PUCCH in the time domain and the first SRS and the first PUCCH belong to the same uplink burst, the terminal device may transmit the first PUCCH based on the first channel access parameters. If access of the first PUCCH is failed, the terminal device may transmit the first SRS based on the at least part of the first channel access parameters.

Similarly, taking the first uplink channel being the first PUSCH and the second uplink channel being the second PUSCH as an example, in the implementation of the present application, if the channel access type in the first channel access parameters is Type2A channel access or Type2B channel access or Type2C channel access, the terminal device may transmit the second PUSCH based on the at least part of the first channel access parameters. For example, the terminal device may transmit the second PUSCH based on a first channel access type and/or an ECP length in the first channel access parameters; the terminal device may also transmit the second PUSCH based on the first channel access type, the first ECP length, and the first CAPC in the first channel access parameters.

Or, if the second PUSCH belongs to the first channel occupancy time of the network device, the terminal device may transmit the second PUSCH based on the at least part of the first channel access parameters. For example, the terminal device may transmit the second PUSCH based on the first channel access type and/or the first ECP length in the first channel access parameters; the terminal device may also transmit the second PUSCH based on the first channel access type, the first ECP length, and the first CAPC in the first channel access parameters.

Or, if the channel access type in the first channel access parameters is Type2A channel access or Type2B channel access or Type2C channel access and the second PUSCH belongs to the first channel occupancy time of the network device, the terminal device may transmit the second PUSCH based on the at least part of the first channel access parameters. For example, the terminal device may transmit the second PUSCH based on the first channel access type and/or the first ECP length in the first channel access parameters; the terminal device may also transmit the second PUSCH based on the first channel access type, the first ECP length, and the first CAPC in the first channel access parameters.

Or, if the first PUSCH and the second PUSCH belong to a same uplink burst, the second PUSCH is located after the first PUSCH in a time domain and channel access of the first PUSCH is failed, the terminal device may transmit the second PUSCH based on the at least part of the first channel access parameters. Specifically, assuming that the second PUSCH is located after the first PUSCH in the time domain and the second PUSCH and the first PUSCH belong to the same uplink burst, the terminal device may transmit the first PUSCH based on the first channel access parameters. If access of the first PUSCH is failed, the terminal device may transmit the second PUSCH based on the at least part of the first channel access parameters.

Optionally, in some implementations, the terminal device transmitting the second uplink channel or not transmitting the second uplink channel according to the at least part of the first channel access parameters or the second channel access parameters, includes: in a case that the first uplink channel and the second uplink channel belong to a same uplink burst and channel access of the first uplink channel is failed, the terminal device transmitting the second uplink channel or not transmitting the second uplink channel according to the second channel access parameters.

Optionally, in some implementations, the second channel access parameters are preset channel access parameters or channel access parameters configured through a high-layer signaling.

The same uplink burst in an implementation of the present application may mean that the first uplink channel and the second uplink channel are transmitted continuously during a transmission process or there is a gap between the first uplink channel and the second uplink channel during a transmission process but the gap is less than or equal to 16 µs.

Taking the first uplink channel being the first PUSCH and the second uplink channel being the first SRS as an example, in an implementation of the present application, in a case that the first PUSCH and the first SRS belong to a same burst, the terminal device may transmit the first SRS based on the second channel access parameters.

Similarly, taking the first uplink channel being the first PUCCH and the second uplink channel being the first SRS as an example, in an implementation of the present application, in a case that the first PUCCH and the first SRS belong to a same burst, the terminal device may transmit the first SRS based on the second channel access parameters.

Similarly, for a case that the first uplink channel is the first PUSCH and the second uplink channel is the second PUSCH, in a case that the first PUSCH and the second PUSCH belong to a same burst, the terminal device may transmit the second PUSCH based on the second channel access parameters.

The second channel access parameters in an implementation of the present application may be preset or configured through a high-layer signaling. For example, they may be configured through a Radio Resource Control (RRC) or a Media Access Control Control Element (MAC CE).

Optionally, in some implementations, the channel access type in the second channel access parameters includes Type1 channel access.

Optionally, in some implementations, if the resources for transmitting the second uplink channel belong to the first channel occupancy time of the network device, a channel access type in the second channel access parameters includes Type2A channel access.

Optionally, in some implementations, an ECP length in the second channel access parameters is 0.

Optionally, in some implementations, a CAPC in the second channel access parameters is 1, or is a CAPC selected by the terminal device itself.

In an implementation of the present application, if the terminal device determines that access parameters for transmitting the second uplink channel are the second channel access parameters, the second uplink channel may be transmitted based on Type1 channel access in one implementation. In another implementation, if the resources for transmitting the second uplink channel belong to the first channel occupancy time of the network device, the terminal device may transmit the second uplink channel based on Type2A channel access.

Optionally, in some implementations, the method further includes: the terminal device determines whether the resources used for transmitting the second uplink channel belong to the first channel occupancy time of the network device according to second indication information.

In an implementation of the present application, whether the resources used for transmitting the second uplink channel belong to the first channel occupancy time of the network device may be determined according to the second indication information. The second indication information may be sent by the network device to facilitate determination of the terminal device. The second indication information in the implementation of the present application may be Slot Format Indication (SFI).

Optionally, in some implementations, the first uplink channel includes a first Physical Uplink Shared Channel (PUSCH) or a first Physical Uplink Control Channel (PUCCH), and the second uplink channel includes a second PUSCH or a second PUCCH or a channel Sounding Reference Signal (SRS).

Optionally, in some implementations, the first DCI is a DL grant, the first uplink channel includes a first PUCCH, and the second uplink channel includes an SRS, wherein the first DCI is used for scheduling transmission of a first PDSCH, HARQ-ACK information corresponding to the first PDSCH is carried in the first PUCCH, and the first DCI is also used for triggering transmission of the SRS.

Optionally, in some implementations, the first DCI is a UL grant, the first uplink channel includes a first PUSCH, and the second uplink channel includes an SRS, wherein the first DCI is used for scheduling transmission of the first PUSCH, and the first DCI is also used for triggering transmission of the SRS.

Optionally, in some implementations, the first DCI is a UL grant, the first uplink channel includes a first PUSCH, and the second uplink channel includes a second PUSCH, wherein the first DCI is used for scheduling transmission of the first PUSCH and the second PUSCH.

In an implementation of the present application, the first uplink channel may be a first PUSCH or a first PUCCH, and the second uplink channel may be a second PUSCH or a second PUCCH or an SRS.

In a case that the first DCI is a DL grant, the first uplink channel may include a first PUCCH and the second uplink channel may include an SRS. The first DCI in the implementation of the present application may be used for scheduling transmission of a first PDSCH, while the first PDSCH is transmitted through the first PUCCH. Therefore, the first channel access parameters in the implementation of the present application are used for transmitting the first PUCCH, so that the first PDSCH may be scheduled based on the first DCI.

Similarly, a case that the first uplink channel is a first PUSCH and the second uplink channel is an SRS or the first uplink channel is a first PUSCH and the second uplink channel is a second PUSCH may be referred to the foregoing contents, and will not be repeated herein for brevity.

Figure 5A:
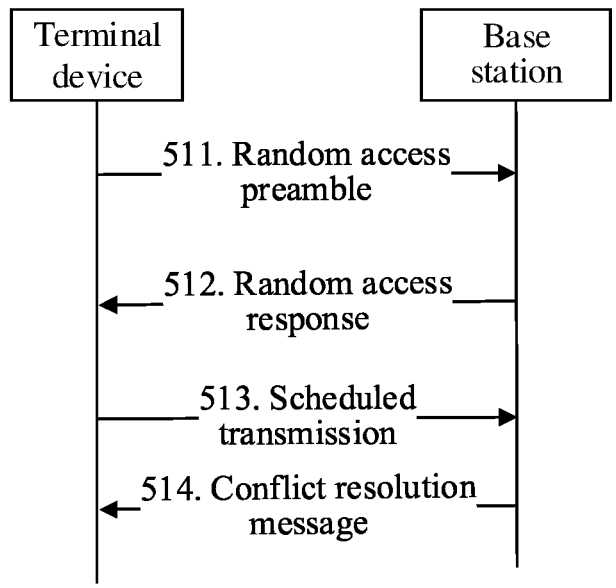
FIG. 5A is a schematic diagram of a random access procedure according to one implementation of the present application.

The implementation of the present application may also be applied to determination of channel access parameters on a shared channel in a random access procedure. The random access procedure may include a four-act random access procedure and a two-act random access procedure. As shown in FIG. 5A, the four-act random access procedure may include acts 511-514.

In act 511, a UE sends a random access preamble sequence (which may also be known as message 1 (MSG1)) to a base station.

In act 512, after detecting that the UE sends the random access preamble sequence, the base station sends a Random Access Response (RAR) (that is, message 2 (MSG2)) to the UE to inform the UE of uplink resource information that may be used when message 3 (MSG3) is sent, assigns a temporary Radio Network Temporary Identity (RNTI) to the UE, and provides a Timing Advance Command (TAC) to the UE, and the like. If the UE does not detect the RAR within an RAR window, the UE performs retransmission of a PRACH sequence. If the UE detects the RAR in the RAR window, the UE may transmit MSG3 according to a UL grant indicated by the RAR.

In act 513, after receiving the Random Access Response (RAR), the UE sends MSG3 in an uplink resource indicated by a Random Access Response message, and HARQ retransmission is allowed in this act.

In act 514, the base station sends MSG4, which includes a contention resolution message, to the UE, and allocates an uplink transmission resource to the UE at the same time. HARQ retransmission is allowed in this act. When receiving MSG4 sent by the base station, the UE will check whether MSG4 includes part of contents in MSG3 sent by the UE. If yes, it is indicated that a random access procedure of the UE is successful; otherwise, it is considered that a random procedure is failed, and the UE may initiate a random access procedure from the first act again.

Figure 5B:
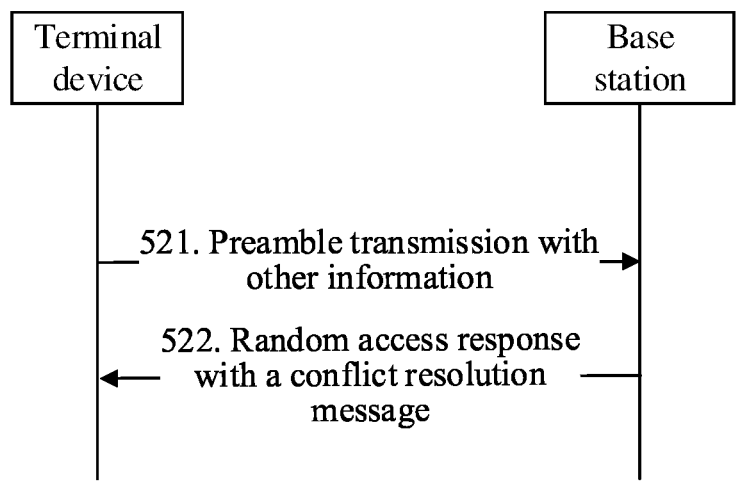
FIG. 5B is a schematic diagram of a random access procedure according to another implementation of the present application.

Delay of the four-act random access procedure is relatively large, so the four-act random access procedure is not suitable for low-delay and high reliability scenes in 5G. A solution of a two-act Random Access Channel (RACH) process, which may reduce access delay compared with a four-act RACH process, is proposed in a standardization process of NR. The two-act RACH process shown in FIG. 5B may include acts 521-522.

In act 521, a UE sends a random access preamble sequence with other information to a base station.

In 522, the UE receives a RAR with a conflict resolution message sent by the base station.

To put it simply, it is equivalent to combining the first act and the third act of the four-act RACH process into the first act in the two-act RACH process (message A, MSGA), combining the second act and the fourth act of the four-act RACH process into the second act in the two-act RACH process (message B, MSGB). In the first act of two-act RACH, the UE needs to send a preamble and a PUSCH, that is, MSGA includes the preamble and the PUSCH.

If the terminal device needs to transmit the preamble and the PUSCH in one random access procedure, how to determine channel access parameters of at least two channels, i.e., the preamble and the PUSCH needs to be solved.

Therefore, an implementation of the present application provides a following solution, so as to determine channel access parameters of at least two channels in one random access procedure, thereby ensuring fair sharing of resources on a shared channel.

As shown in FIG. 6, which is a schematic flowchart of a wireless communication method 600 according to yet another implementation of the present application, the method 600 may include acts 610-620.

In act 610, a terminal device determines first channel access parameters, the first channel access parameters are used for transmitting a first uplink channel, and the first channel access parameters includes at least one of Type1 channel access, a first Extended Cyclic Prefix (ECP) length, or a first Channel Access Priority Class (CAPC).

That the first channel access parameters in the implementation of the present application are used for transmitting the first uplink channel may mean that the first channel access parameters are used for performing channel detection. In one mode, if the channel detection performed based on the first channel access parameters is successful, the terminal device may determine that the first channel access parameters are used for transmitting the first uplink channel; if the channel detection performed based on the first channel access parameters is failed, the terminal device determines that the first uplink channel cannot be transmitted based on the first channel access parameters. In such a case, the terminal device no longer determines channel access parameters of a second uplink channel.

In act 620, the terminal device determines third channel access parameters according to the first channel access parameters and/or second channel access parameters, wherein the second channel access parameters include at least one of Type1 channel access, a second ECP length, or a second CAPC, the third channel access parameters are used for transmitting a second uplink channel, and the first uplink channel is located before the second uplink channel in a time domain. In an implementation of the present application, the second channel access parameters may be the same as the first channel access parameters or different from the first channel access parameters, which is not limited specifically in the present application.

In an implementation of the present application, the first uplink channel is located before the second uplink channel in the time domain, that is, the terminal device may first determine transmission of the first uplink channel based on the first channel access parameters. If access of the first uplink channel is successful, the terminal device may determine the third channel access parameters used for transmitting the second uplink channel according to the first channel access parameters and/or the second channel access parameters.

In the wireless communication method according to the implementation of the present application, for the two-act random access procedure of the terminal device, the terminal device may determine the third channel access parameters used for transmitting the second uplink channel based on the first channel access parameters and/or the second channel access parameters, thereby ensuring fair sharing of resources on a shared channel.

Optionally, in some implementations, the first CAPC is preset or is determined according to a priority of a service carried in the first uplink channel or a corresponding channel occupancy time length when the first uplink channel and the second uplink channel belong to the same channel occupancy time; and/or the second CAPC is preset or is determined according to a priority of a service carried in the second uplink channel.

In ab implementation of the present application, the first CAPC and the second CAPC may be preset to 1. Or, the first CAPC and the second CAPC may be determined according to a priority of a service carried in the first uplink channel. For example, if the priority of the service carried in the first uplink channel is higher, it is determined that the first CAPC and the second CAPC may be 1; if the priority of the service carried in the first uplink channel is lower, it is determined that the first APC and the second CAPC may be 4, which is not limited specifically in the present application.

The first CAPC in an implementation of the present application may also be determined according to the corresponding channel occupancy time length when the first uplink channel and the second uplink channel belong to the same channel occupancy time. For example, if the corresponding channel occupancy time length, when the first uplink channel and the second uplink channel belong to the same channel occupancy time, is 2 ms, the terminal device may determine that the first CAPC may be 1; if the corresponding channel occupancy time length, when the first uplink channel and the second uplink channel belong to the same channel occupancy time, is 3 ms, then the terminal device may determine that the first CAPC may be 2; if the corresponding channel occupancy time length, when the first uplink channel and the second uplink channel belong to the same channel occupancy time, is 6 ms or 10 ms, then the terminal device may determine that the first CAPC may be 3 or 4.

It should be understood that the first CAPC in implementations of the present application may be the same or different. For example, in a case that the first CAPC is preset to 1, the second CAPC may also be preset to 1; in a case that the first CAPC is preset to 1, the second CAPC may also be preset to 2 or 3, and so on, which is not limited specifically in the present application.

It should also be understood that the above numerical values are described by way of example only, and other numerical values may also be used, which should not cause specified limitations to the present application.

Optionally, in some implementations, the terminal device determines the third channel access parameters according to the first channel access parameters and/or the second channel access parameters, including: the terminal device determines the third channel access parameters according to the first CAPC and the second CAPC; and/or the terminal device determines the third channel access parameters according to a resource position relationship between the first uplink channel and the second uplink channel.

Optionally, in some implementations, the terminal device determines the third channel access parameters according to the first CAPC and the second CAPC, including: if the first CAPC is less than the second CAPC, the terminal device determines that a channel access type included in the third channel access parameters is Type1 channel access; or if the first CAPC is greater than or equal to the second CAPC, the terminal device determines that the channel access type included in the third channel access parameters is one of Type2A channel access, Type2B channel access, and Type2C channel access.

In an implementation of the present application, the terminal device may determine the third channel access parameters according to the first CAPC and the second CAPC and/or determine the third channel access parameters according to the resource position relationship between the first uplink channel and the second uplink channel, and the third channel access parameters may include a channel access type and a CAPC used for transmitting the second uplink channel.

Specifically, assuming that the first CAPC is 1 and the second CAPC is 2, that is, the first CAPC is smaller than the second CAPC, the terminal device determines that channel access parameters used for transmitting the second uplink channel may be Type1 channel access; assuming that the first CAPC is 1 and the second CAPC is 1, that is, the first CAPC is equal to the second CAPC, the terminal device determines that channel access parameters used for transmitting the second uplink channel may be Type2A channel access or Type2B channel access or Type2C channel access.

It is noted above that the terminal device may determine the third channel access parameters according to the resource location relationship between the first uplink channel and the second uplink channel, which will be described specifically below.

Optionally, in some implementations, the method 600 may further include: the terminal device determines first channel occupancy time used for transmitting the first uplink channel according to the first CAPC; the terminal device determines the third channel access parameters according to the resource position relationship between the first uplink channel and the second uplink channel, including: if resources of the second uplink channel are within the first channel occupancy time, the terminal device determines that a channel access type included in the third channel access parameters is one of Type2A channel access, Type2B channel access, and Type2C channel access; or if the resources of the second uplink channel are not within the first channel occupancy time, the terminal device determines that the channel access type included in the third channel access parameters is Type1 channel access.

In an implementation of the present application, assuming that a value of the first CAPC is 1, the terminal device determines that the first channel occupancy time used for transmitting the first uplink channel is 2 ms. If the resources of the second uplink channel are within 2 ms, the terminal device may determine that the channel access type included in the third channel access parameters is one of Type2A channel access, Type2B channel access, and Type2C channel access, so that the terminal device may transmit the second uplink channel based on one of Type2A channel access, Type2B channel access, and Type2C channel access; if the resources of the second uplink channel are not within 2 ms, the terminal device may determine that the channel access type included in the third channel access parameters is Type2A channel access, so that the terminal device may transmit the second uplink channel based on Type2A channel access.

Optionally, in some implementations, the terminal device determines that the channel access type included in the third channel access parameters is one of Type2A channel access, Type2B channel access, and Type2C channel access, including: the terminal device determines that the channel access type of the second uplink channel is one of Type2A channel access, Type2B channel access, or Type2C channel access according to a gap between a starting position of the resources of second uplink channel and an end position of resources of the first uplink channel.

Optionally, in some implementations, the terminal device determines that the channel access type of the second uplink channel is one of Type2A channel access, Type2B channel access, or Type2C channel access according to the gap between the starting position of the resources of second uplink channel and the end position of the resources of the first uplink channel, including: if the gap between the starting position of the resources of the second uplink channel and the end position of the resources of the first uplink channel is less than or equal to a first threshold, the terminal device determines that the channel access type of the second uplink channel is Type2C channel access; if the gap between the starting position of the resources of the second uplink channel and the end position of the resources of the first uplink channel is equal to the first threshold, the terminal device determines that the channel access type of the second uplink channel is Type2B channel access; if the gap between the starting position of the resources of the second uplink channel and the end position of the resources of the first uplink channel is greater than or equal to a second threshold, the terminal device determines that the channel access type of the second uplink channel is Type2A channel access.

In an implementation of the present application, the terminal device may determine the channel access type of the second uplink channel according to the gap between the starting position of the resources of the second uplink channel and the end position of the resources of the first uplink channel. If the gap between the starting position of the resources of the second uplink channel and the end position of the resources of the first uplink channel is less than or equal to the first threshold, for example, the first threshold is 16 μs, and the gap between the starting position of the resources of the second uplink channel and the end position of the resources of the first uplink channel is 10 μs, the terminal device may determine that Type2C channel access is used for transmitting the second uplink channel.

If the gap between the starting position of the resources of the second uplink channel and the end position of the resources of the first uplink channel is equal to the first threshold, for example, the first threshold is 16 μs, and the gap between the starting position of the resources of the second uplink channel and the end position of the resources of the first uplink channel is 16 μs, the terminal device may determine that Type2B channel access is used for transmitting the second uplink channel.

If the gap between the starting position of the resources of the second uplink channel and the end position of the resources of the first uplink channel is greater than or equal to the second threshold, for example, the second threshold is 25 μs, and the gap between the starting position of the resources of the second uplink channel and the end position of the resources of the first uplink channel is 25 μs or 30 μs, the terminal device may determine that Type2A channel access is used for transmitting the second uplink channel.

Optionally, in some implementations, in a case that the terminal device determines that the channel access type included in the third channel access parameters is one of Type2A channel access, Type2B channel access, and Type2C channel access, the method further includes: the terminal device determining an Extended Cyclic Prefix (ECP) length of a first symbol in the second uplink channel according to the determined channel access type included in the third channel access parameters and the starting position of the resources of the second uplink channel.

In an implementation of the present application, if the terminal device determines that a channel access parameter used for transmitting the second uplink channel is Type2A channel, the terminal device may determine an ECP length of a first symbol in the second uplink channel according to the Type2A channel and the starting position of the resources of the second uplink channel. For example, the ECP length of the first symbol in the second uplink channel may be C1*symbol length-25 μs, wherein a value of C1 may be 1 or another value, etc.

In an implementation of the present application, if the terminal device determines that the channel access parameter used for transmitting the second uplink channel is Type2C channel, the terminal device may determine the ECP length of the first symbol in the second uplink channel according to Type2C channel and the starting position of the resources of the second uplink channel. For example, the ECP length of the first symbol in the second uplink channel may be C2*symbol length-16 μs-TA, wherein a value of C2 may be any one of 1 to 28.

It should be understood that the above numerical values are described by way of example only, and other numerical values may also be used, which should not cause specified limitations to the present application.

Optionally, in some implementations, the terminal device determines the third channel access parameters according to the first channel access parameters and/or the second channel access parameters, including: in a case that a first preset condition is met, the terminal device determines that the third channel access parameters are the second channel access parameters.

Optionally, in some implementations, the first preset condition includes: the first CAPC is less than the second CAPC; or the terminal device determines the first channel occupancy time used for transmitting the first uplink channel according to the first CAPC, and the resources of the second uplink channel are not within the first channel occupancy time.

In an implementation of the present application, assuming that a value of the first CAPC is 1 and a value of the second CAPC is 2, that is, the first CAPC is less than the second CAPC, the terminal device may determine that the second CAPC with the value of 2 is used for transmitting the second uplink channel; or assuming that a value of the first CAPC is 1, the terminal device determines that the first channel occupancy time for transmitting the first uplink channel is 2 ms according to the first CAPC, and if the resources of the second uplink channel are not within 2 ms, the terminal device may determine that the second CAPC is used for transmitting the second uplink channel.

Specifically, if a value of the second CAPC is 1, the terminal device may determine that a CAPC with a value of 1 is used for transmitting the second uplink channel; if the value of the second CAPC is 2, the terminal device may determine that a CAPC with a value of 2 is used for transmitting the second uplink channel Optionally, in some implementations, the first uplink channel is a PRACH and the second uplink channel is a PUSCH.

The first uplink channel and the second uplink channel in ab implementation of the present application may be used for transmitting a message A in a random access procedure.

The first uplink channel may be a PRACH, which may be used for transmitting a preamble sequence, that is, message 1 in the random access procedure, and the second uplink channel may be a PUSCH, which may be used for transmitting message 3 in the random access procedure.

Optionally, in some implementations, before the terminal device determines the third channel access parameters according to the first channel access parameters and/or the second channel access parameters, the method further includes: the terminal device acquiring first channel occupancy time used for transmitting the first uplink channel according to the first channel access parameters.

In an implementation of the present application, after determining the first channel access parameters, the terminal device may acquire the first channel occupancy time used for transmitting the first uplink channel according to the first channel access parameters. For example, if the channel access type in the first channel access parameters is Type1 channel access, the first channel occupancy time for transmitting the first uplink channel may be 2 ms, that is, the terminal device may transmit the first uplink channel within 2 ms.

After determining the first channel occupancy time for transmitting the first uplink channel, the terminal device may determine channel access parameters used for transmitting the second uplink channel according to the first uplink channel and/or the second uplink channel; otherwise, the terminal device may no longer determine channel access parameters used for transmitting the second uplink channel.

Method implementations of the present application are described in detail above with reference to FIG. 1 to FIG. 6, and apparatus implementations of the present application will be described below in conjunction with FIG. 7 to FIG. 10. The apparatus implementations and the method implementations corresponds to each other, therefore parts that are not described in detail may be referred to the method implementations of previous parts.

FIG. 7 is a wireless communication apparatus 700 according to an implementation of the present application, and the wireless communication apparatus may include a communication module 710 and a processing module 720.

The communication module 710 is configured to receive first indication information sent by a network device, herein the first indication information indicates first channel access parameters, the first channel access parameters are used for transmitting a first uplink channel, the first indication information is information carried in first DCI, and the first DCI is used for determining transmission of the first uplink channel and a second uplink channel.

The processing module 720 is configured to determine that at least part of the first channel access parameters are used for transmitting the second uplink channel; or determine that second channel access parameters are used for transmitting the second uplink channel; or determine not to transmit the second uplink channel.

Optionally, in some implementations, the first indication information indicating the first channel access parameters includes one of following cases: the first indication information indicates a first channel access type, a first ECP length, and a first CAPC; the first indication information indicates a first channel access type and a first ECP length.

Optionally, in some implementations, the first channel access parameters include at least one of the first channel access type, the first ECP length, and the first CAPC, and the processing module 720 is further configured to transmit the second uplink channel according to at least one of the first channel access type, the first ECP length, and the first CAPC.

Optionally, in some implementations, the processing module 720 is further configured to determine that an ECP length of the second uplink channel is 0.

Optionally, in some implementations, the processing module 720 is further configured to determine a channel access type used for transmitting the second uplink channel according to whether resources used for transmitting the second uplink channel belong to first channel occupancy time of the network device.

Optionally, in some implementations, the processing module 720 is further configured to, if the resources used for transmitting the second uplink channel belong to the first channel occupancy time of the network device, determine that the channel access type used for transmitting the second uplink channel is Type2A channel access or one of Type2A channel access, Type2B channel access, or Type2A channel access; or if the resources used for transmitting the second uplink channel do not belong to the first channel occupancy time of the network device, determine that the channel access type used for transmitting the second uplink channel is Type1 channel access.

Optionally, in some implementations, the processing module 720 is further configured to transmit the second uplink channel according to the first channel access type and the first ECP length.

Optionally, in some implementations, the processing module 720 is further configured to determine that a value of a CAPC used for transmitting the second uplink channel is 1; or select a CAPC used for transmitting the second uplink channel by itself according to the second uplink channel.

Optionally, in some implementations, the processing module 720 is further configured to, in a case that a first preset condition is met, transmit the second uplink channel according to at least part of the first channel access parameters; or in a case that the first preset condition is not met, transmit the second uplink channel according to the second channel access parameters.

Optionally, in some implementations, the first preset condition includes at least one of following conditions: the channel access type in the first channel access parameters is at least one of Type2A channel access, Type2B channel access, and Type2C channel access; the second uplink channel belongs to the channel occupancy time of the network device; the first uplink channel and the second uplink channel belong to a same uplink burst, the second uplink channel is located after the first uplink channel in a time domain, and channel access of the first uplink channel is failed.

Optionally, in some implementations, the processing module 720 is further configured to, in a case that the first uplink channel and the second uplink channel belong to the same uplink burst and channel access of the first uplink channel is failed, transmit the second uplink channel according to the second channel access parameters or not transmit the second uplink channel.

Optionally, in some implementations, the second channel access parameters are preset channel access parameters or channel access parameters configured through a high-layer signaling.

Optionally, in some implementations, the channel access type in the second channel access parameters includes Type1 channel access.

Optionally, in some implementations, if the resources used for transmitting the second uplink channel belong to the first channel occupancy time of the network device, the channel access type in the second channel access parameters includes Type2A channel access.

Optionally, in some implementations, an ECP length in the second channel access parameters is 0.

Optionally, in some implementations, a CAPC in the second channel access parameters is 1, or is a CAPC selected by the processing module itself.

Optionally, in some implementations, the processing module 720 is further configured to determine whether the resources used for transmitting the second uplink channel belong to the first channel occupancy time of the network device according to second indication information.

Optionally, in some implementations, the first uplink channel includes a first Physical Uplink Shared Channel (PUSCH) or a first Physical Uplink Control Channel (PUCCH), and the second uplink channel includes a second PUSCH or a second PUCCH or an SRS.

Optionally, in some implementations, the first DCI is a DL grant, the first uplink channel includes a first PUCCH, and the second uplink channel includes an SRS, wherein the first DCI is used for scheduling transmission of a first PDSCH, HARQ-ACK information corresponding to the first PDSCH is carried in the first PUCCH, and the first DCI is also used for triggering transmission of the SRS.

Optionally, in some implementations, the first DCI is a UL grant, the first uplink channel includes a first PUSCH, and the second uplink channel includes an SRS, wherein the first DCI is used for scheduling transmission of the first PUSCH, and the first DCI is also used for triggering transmission of the SRS.

Optionally, in some implementations, the first DCI is a UL grant, the first uplink channel includes a first PUSCH, and the second uplink channel includes a second PUSCH, wherein the first DCI is used for scheduling transmission of the first PUSCH and the second PUSCH.

FIG. 8 is a schematic diagram of a structure of a wireless communication apparatus 800 according to an implementation of the present application, which may include a processing module 810.

The processing module 810 is configured to determine first channel access parameters, which are used for transmitting a first uplink channel, herein the first channel access parameters include at least one of Type1 channel access, a first Extended Cyclic Prefix (ECP) length, and a first Channel Access Priority Class (CAPC); and determine third channel access parameters according to the first channel access parameters and/or second channel access parameters, wherein the second channel access parameters include at least one of Type1 channel access, a second ECP length, and a second CAPC, the third channel access parameters are used for transmitting a second uplink channel, and the first uplink channel is located before the second uplink channel in a time domain.

Optionally, in some implementations, the first CAPC is preset or is determined according to a priority of a service carried in the first uplink channel or a corresponding channel occupancy time length when the first uplink channel and the second uplink channel belong to the same channel occupancy time; and/or the second CAPC is preset or is determined according to a priority of a service carried in the second uplink channel.

Optionally, in some implementations, the processing module 810 is further configured to determine the third channel access parameters according to the first CAPC and the second CAPC; and/or determine the third channel access parameters according to a resource position relationship between the first uplink channel and the second uplink channel.

Optionally, in some implementations, the processing module 810 is further configured to: if the first CAPC is less than the second CAPC, determine that a channel access type included in the third channel access parameters is Type1 channel access; or if the first CAPC is greater than or equal to the second CAPC, determine that the channel access type included in the third channel access parameters is one of Type2A channel access, Type2B channel access, and Type2C channel access.

Optionally, in some implementations, the processing module 810 is further configured to, if resources of the second uplink channel are within the first channel occupancy time, determine that the channel access type included in the third channel access parameters is one of Type2A channel access, Type2B channel access, and Type2C channel access; or if the resources of the second uplink channel are not within the first channel occupancy time, determine that the channel access type included in the third channel access parameters is Type1 channel access.

Optionally, in some implementations, the processing module 810 is further configured to determine that the channel access type of the second uplink channel is one of Type2A channel access, Type2B channel access, or Type2C channel access according to a gap between a starting position of resources of the second uplink channel and an end position of resources of the first uplink channel.

Optionally, in some implementations, the processing module 810 is further configured to, if the gap between the starting position of the resources of the second uplink channel and the end position of the resources of the first uplink channel is less than or equal to a first threshold, determine that the channel access type of the second uplink channel is the Type2C channel access; if the gap between the starting position of the resources of the second uplink channel and the end position of the resources of the first uplink channel is equal to the first threshold, determine that the channel access type of the second uplink channel is the Type2B channel access; if the gap between the starting position of the resources of the second uplink channel and the end position of the resources of the first uplink channel is greater than or equal to a second threshold, determine that the channel access type of the second uplink channel is the Type2A channel access.

Optionally, in some implementations, the processing module 810 is further configured to determine an Extended Cyclic Prefix (ECP) length of a first symbol in the second uplink channel according to the determined channel access type included in the third channel access parameters and the starting position of the resources of the second uplink channel.

Optionally, in some implementations, the processing module 810 is further configured to determine that the third channel access parameters are the second channel access parameters in a case that a first preset condition is met.

Optionally, in some implementations, the first preset condition includes: the first CAPC is less than the second CAPC; or a terminal device determines first channel occupancy time used for transmitting the first uplink channel according to the first CAPC, and the resources of the second uplink channel are not within the first channel occupancy time.

Optionally, in some implementations, the first uplink channel is a PRACH and the second uplink channel is a PUSCH.

Optionally, in some implementations, the processing module 810 is further configured to acquire first channel occupancy time used for transmitting the first uplink channel according to the first channel access parameters.

Figure 9:
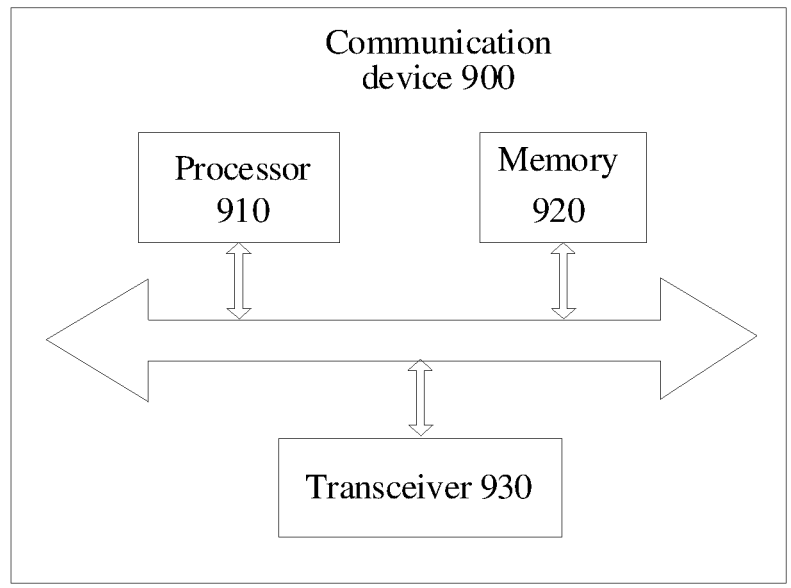
FIG. 9 is a schematic diagram of a structure of a communication device according to an implementation of the present application.

An implementation of the present application further provides a communication device 900, which, as shown in FIG. 9, includes a processor 910 and a memory 920. The memory is configured to store a computer program, and the processor is configured to invoke and run the computer program stored in the memory to perform the methods in the implementations of the present application.

The processor 910 may invoke and run the computer program from the memory 920 to implement the methods in the implementations of the present application.

The memory 920 may be a separate device independent of the processor 910 or may be integrated in the processor 910.

Optionally, as shown in FIG. 9, the communication device 900 may further include a transceiver 930. The processor 910 may control the transceiver 930 to communicate with another device. Specifically, the transceiver 730 may send information or data to another device or receive information or data sent by another device.

The transceiver 930 may include a transmitter and a receiver. The transceiver 930 may further include antennas, a quantity of which may be one or more.

Optionally, the communication device 900 may be specifically the mobile terminal/terminal device of the implementations of the present application, and the communication device 900 may implement corresponding processes implemented by the mobile terminal/terminal device in various methods of the implementations of the present application, which will not be repeated herein for brevity.

Figure 10:
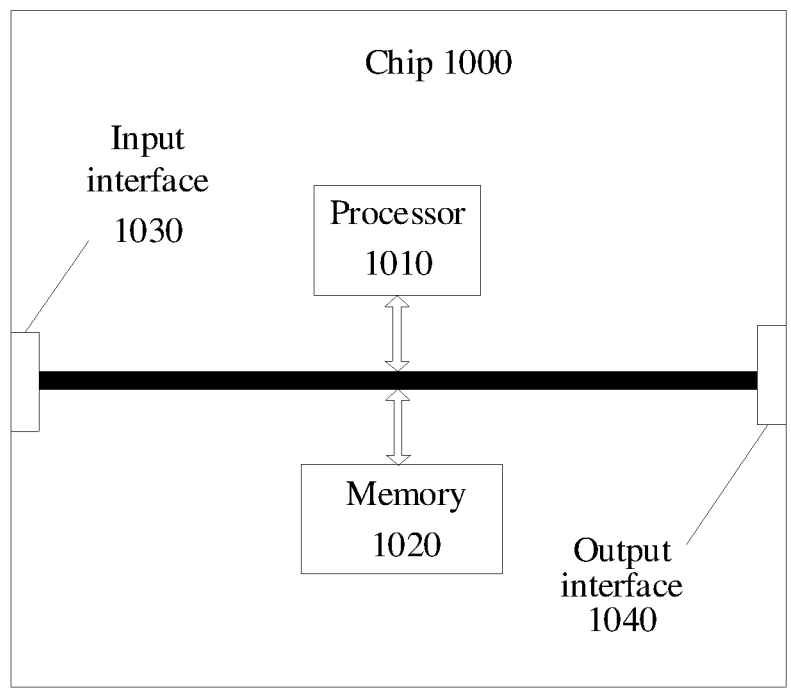
FIG. 10 is a schematic diagram of a structure of a chip according to an implementation of the present application.

FIG. 10 is a schematic diagram of a structure of a chip according to an implementation of the present application. The chip 1000 shown in FIG. 10 includes a processor 1010, which may invoke and run a computer program from a memory to implement the methods in the implementations of the present application.

Optionally, as shown in FIG. 10, the chip 1000 may further include a memory 1020. The processor 1010 may invoke and run the computer program from the memory 1020 to implement the methods in the implementations of the present application.

The memory 1020 may be a separate device independent of the processor 1010 or may be integrated in the processor 1010.

Optionally, the chip 1000 may further include an input interface 1030. The processor 1010 may control the input interface 1030 to communicate with another device or chip. Specifically, the processor 410 may acquire information or data sent by another device or chip.

Optionally, the chip 1000 may further include an output interface 1040. The processor 1010 may control the output interface 1040 to communicate with another device or chip. Specifically, the processor 410 may output information or data to another device or chip.

Optionally, the chip may be applied to the mobile terminal/terminal device in the implementations of the present application, and the chip may implement corresponding processes implemented by the mobile terminal/terminal device in various methods of the implementations of the present application, which will not be repeated herein for brevity.

It should be understood that the chip mentioned in the implementations of the present application may also be referred to as a system-level chip, a system chip, a chip system, or a system-on-chip, etc.

It should be understood that the processor in the implementations of the present application may be an integrated circuit chip having a signal processing capability. In an implementation process, each of the acts of the foregoing method implementations may be completed through an integrated logic circuit of hardware in the processor or instructions in a form of software. The processor described above may be a general purpose processor, a Digital Signal Processor (DSP), an Application Specific Integrated Circuit (ASIC), a Field Programmable Gate Array (FPGA), or another programmable logic device, a discrete gate or a transistor logic device, or a discrete hardware component. The processor may implement or perform various methods, acts, and logical block diagrams disclosed in the implementations of the present application. The general purpose processor may be a microprocessor, or the processor may also be any conventional processor, or the like. The acts of the methods disclosed in the implementations of the present application may be directly embodied to be completed by a hardware decoding processor, or may be completed by using a combination of hardware and software modules in a decoding processor. The software modules may be located in a storage medium which is mature in the art, such as a random access memory, a flash memory, a read-only memory, a programmable read-only memory, an electrically erasable programmable memory, and a register. The storage medium is located in a memory, and the processor reads information in the memory and completes the acts of the foregoing methods in combination with its hardware.

It may be understood that the memory in the implementations of the present application may be a volatile memory or a non-volatile memory, or may include both a volatile memory and a non-volatile memory. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. Through exemplary but non-restrictive description, many forms of RAMs may be available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memory in the systems and methods described herein is intended to include, but is not limited to, these and any other suitable types of memories.

It should be understood that the foregoing memory is described in an exemplary but non-limiting sense. For example, the memory in the implementations of the present application may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). That is to say, the memory in the implementations of the present application is intended to include, but is not limited to, these and any other suitable types of memories.

An implementation of the present application further provides a computer readable storage medium configured to store a computer program.

Optionally, the computer readable storage medium may be applied to the mobile terminal/terminal device in the implementations of the present application, and the computer program enables a computer to perform the corresponding processes implemented by the mobile terminal/terminal device in various methods of the implementations of the present application, which will not be repeated herein for brevity.

An implementation of the present application further provides a computer program product including computer program instructions.

Optionally, the computer program product may be applied to the mobile terminal/terminal device in the implementations of the present application, and the computer program instructions enable a computer to perform the corresponding processes implemented by the mobile terminal/terminal device in various methods of the implementations of the present application, which will not be repeated herein for brevity.

An implementation of the present application further provides a computer program.

Optionally, the computer program may be applied to the mobile terminal/terminal device in the implementations of the present application. When the computer program is running on a computer, the computer is enabled to perform the corresponding processes implemented by the mobile terminal/terminal device in various methods of the implementations of the present application, which will not be repeated herein for brevity.

A person of ordinary skill in the art may recognize that units and algorithm acts in various examples described in combination with the implementations disclosed herein may be implemented in electronic hardware, or a combination of computer software and electronic hardware. Whether these functions are performed by way of hardware or software depends on specific applications and design constraints of the technical solutions. Skilled artisans may use different methods to implement the described functions for each particular application, but such implementation should not be considered to be beyond the scope of the present application.

Those skilled in the art may clearly understand that for the sake of convenience and conciseness of description, specific working processes of the systems, apparatuses, and units described above may be described with reference to corresponding processes in the above method implementations and will not be repeated herein.

In several implementations provided by the present application, it should be understood that the disclosed systems, apparatuses, and methods may be implemented in other ways. For example, the apparatus implementations described above are only illustrative, for example, the division of the units is only a logical function division, and there may be another division manner in actual implementation. For example, multiple units or components may be combined or integrated into another system, or some features may be ignored or not executed. In addition, the shown or discussed coupling or direct coupling or communication connection between each other may be an indirect coupling or communication connection through some interfaces, apparatuses, or units, or may be in electrical, mechanical, or other forms.

The unit described as a separate component may or may not be physically separated, and a component shown as a unit may or may not be a physical unit, i.e., it may be located in one place or may be distributed across multiple network units. Part or all of the units may be selected according to actual needs to achieve the purpose of the implementations.

In addition, various functional units in various implementations of the present application may be integrated into one processing unit, or may exist physically separately, or two or more than two units may be integrated into one unit.

The function, if implemented in a form of software functional unit and sold or used as an independent product, may be stored in a computer readable storage medium. Based on such understanding, the technical solutions of the present application, in essence, or parts of them which contribute to the prior art, or parts of the technical solutions, may be embodied in a form of a software product, which is stored in a storage medium, and includes several instructions for enabling a computer device (which may be a personal computer, a server, or a network device, etc.) to perform all or part of the acts of the methods of various implementations of the present application. The aforementioned storage medium includes various media, such as a U disk, a mobile hard disk, a Read-Only Memory (ROM), a Random Access Memory (RAM), a magnetic disk, or an optical disk, which are capable of storing program codes.

What are described above are merely example implementations of the present application, but the protection scope of the present application is not limited thereto. Any variation or substitution that may easily occur to a person skilled in the art within the technical scope disclosed by the present application shall be included within the protection scope of the present application. Therefore, the protection scope of the present application shall be subject to the protection scope of the claims.

The invention claimed is:

1. A method for wireless communication method, comprising:
receiving, by a terminal device, first indication information sent by a network device, wherein the first indication information indicates first channel access parameters, the first channel access parameters are used for transmitting a first uplink channel, the first indication information is information carried in first Downlink Control Information (DCI), and the first DCI is used for determining transmission of the first uplink channel and a second uplink channel; and
determining, by the terminal device, that second channel access parameters are used for transmitting the second uplink channel; wherein transmitting, by the terminal device, the second uplink channel, according to the at least part of the first channel access parameters or the second channel access parameters comprises:
transmitting, by the terminal device, the second uplink channel according to the second channel access parameters in a case that the first uplink channel and the second uplink channel belong to a same uplink burst and a channel access of the first uplink channel is failed.

2. The method according to claim 1, wherein the second channel access parameters are preset channel access parameters.

3. The method according to claim 1, wherein a channel access type in the second channel access parameters comprises Type1 channel access.

4. The method according to claim 1, wherein if resources for transmitting the second uplink channel belong to first channel occupancy time of the network device, a channel access type in the second channel access parameters comprises Type2A channel access.

5. The method according to claim 1, wherein an Extended Cyclic Prefix (ECP) length in the second channel access parameters is 0.

6. An apparatus for wireless communication, comprising a processor and a transceiver:
  the transceiver is configured to receive first indication information sent by a network device, wherein the first indication information indicates first channel access parameters, the first channel access parameters are used for transmitting a first uplink channel, the first indication information is information carried in first Downlink Control Information (DCI), and the first DCI is used for determining transmission of the first uplink channel and a second uplink channel; and
  the processor is configured to determine that second channel access parameters are used for transmitting the second uplink channel; wherein the processor is further configured to:
  transmit the second uplink channel according to the second channel access parameters in a case that the first uplink channel and the second uplink channel belong to a same uplink burst and channel access of the first uplink channel is failed.

7. The apparatus according to claim 6, wherein the second channel access parameters are preset channel access parameters.

8. The apparatus according to claim 6, wherein a channel access type in the second channel access parameters comprises Type1 channel access.

9. The apparatus claim 6, wherein if resources used for transmitting the second uplink channel belong to first channel occupancy time of the network device, a channel access type in the second channel access parameters comprises Type2A channel access.

10. The apparatus according to claim 6, wherein an Extended Cyclic Prefix (ECP) length in the second channel access parameters is 0.

11. A communication device comprising a processor and a memory, wherein the memory is configured to store a computer program and the processor is configured to invoke and run the computer program stored in the memory to perform the method according to claim 1.

12. A communication device comprising a processor and a memory, wherein the memory is configured to store a computer program and the processor is configured to invoke and run the computer program stored in the memory to perform the method according to claim 2.

13. A communication device comprising a processor and a memory, wherein the memory is configured to store a computer program and the processor is configured to invoke and run the computer program stored in the memory to perform the method according to claim 3.

14. A communication device comprising a processor and a memory, wherein the memory is configured to store a computer program and the processor is configured to invoke and run the computer program stored in the memory to perform the method according to claim 4.

15. A communication device comprising a processor and a memory, wherein the memory is configured to store a computer program and the processor is configured to invoke and run the computer program stored in the memory to perform the method according to claim 5.

16. A chip comprising a processor configured to invoke and run a computer program from a memory, enabling a device having the chip installed thereon to perform the method according to claim 1.

* * * * *